US012659256B2

(12) United States Patent
Bagasrawala et al.

(10) Patent No.: US 12,659,256 B2
(45) Date of Patent: Jun. 16, 2026

(54) PREDICTING EXCESS CAPACITY FOR RADIO ACCESS NETWORK EDGE SYSTEMS

(71) Applicant: Amazon Technologies, Inc., Seattle, WA (US)

(72) Inventors: Shabbir Aliasgar Bagasrawala, Lexington, MA (US); Samir Majumdar, Dublin, CA (US); Brian Scott Karstetter, Western Springs, IL (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 18/434,234

(22) Filed: Feb. 6, 2024

(65) Prior Publication Data

US 2025/0254113 A1    Aug. 7, 2025

(51) Int. Cl.
    *H04L 43/0882*      (2022.01)
    *H04B 17/382*      (2015.01)
    *H04B 17/391*      (2015.01)

(52) U.S. Cl.
    CPC ....... *H04L 43/0882* (2013.01); *H04B 17/382* (2015.01); *H04B 17/3913* (2015.01)

(58) Field of Classification Search
    CPC .............. H04L 43/0882; H04B 17/382; H04B 17/3913
    See application file for complete search history.

(56) References Cited

U.S. PATENT DOCUMENTS

| | | | | |
|---|---|---|---|---|
| 8,589,549 | B1 * | 11/2013 | Vermeulen | G06F 9/50 709/226 |
| 11,711,727 | B1 | 7/2023 | Gupta et al. | |
| 2022/0383324 | A1 * | 12/2022 | Sheshadri | H04L 41/16 |
| 2023/0362658 | A1 | 11/2023 | Shetty et al. | |

FOREIGN PATENT DOCUMENTS

| | | |
|---|---|---|
| WO | 2022125879 A1 | 6/2022 |
| WO | 2024006633 A1 | 1/2024 |

OTHER PUBLICATIONS

International Search Report and Written Opinion for PCT/US25/14756 mailed May 26, 2025.

(Continued)

*Primary Examiner* — Justin Y Lee
(74) *Attorney, Agent, or Firm* — Perilla Knox & Hildebrandt LLP; Thomas B. Hildebrandt

(57) ABSTRACT

Disclosed are various embodiments for predicting excess capacity for radio access network (RAN) edge systems. In one embodiment, resource consumption data is generated by monitoring resource consumption of a plurality of implementations of a distributed unit (DU) and/or centralized unit (CU) used in RANs. A maximum level of resource consumption is predicted for a particular implementation of the DU/CU to be used in a particular RAN based at least in part on the resource consumption data. Excess resource capacity is predicted on a RAN-enabled edge server on which the particular implementation of the DU/CU is deployed for a cell site of the RAN based at least in part on the maximum level of resource consumption.

20 Claims, 13 Drawing Sheets

(56)            References Cited

OTHER PUBLICATIONS

Falcao Eduardo De Lucena et al: "Enhancing fairness in P2P cloud federations", Computers & Electrical Engineering, Pergamon Press, GB, vol. 56, May 17, 2016 (May 17, 2016), pp. 884-897, XP029839775, ISSN: 0045-7906, DOI: 10.1016/J.COMPELECENG.2016.05.007. International Search Report and Written Opinion for PCT/US25/ 14471 mailed Jun. 13, 2025.

* cited by examiner

Figure 2A:
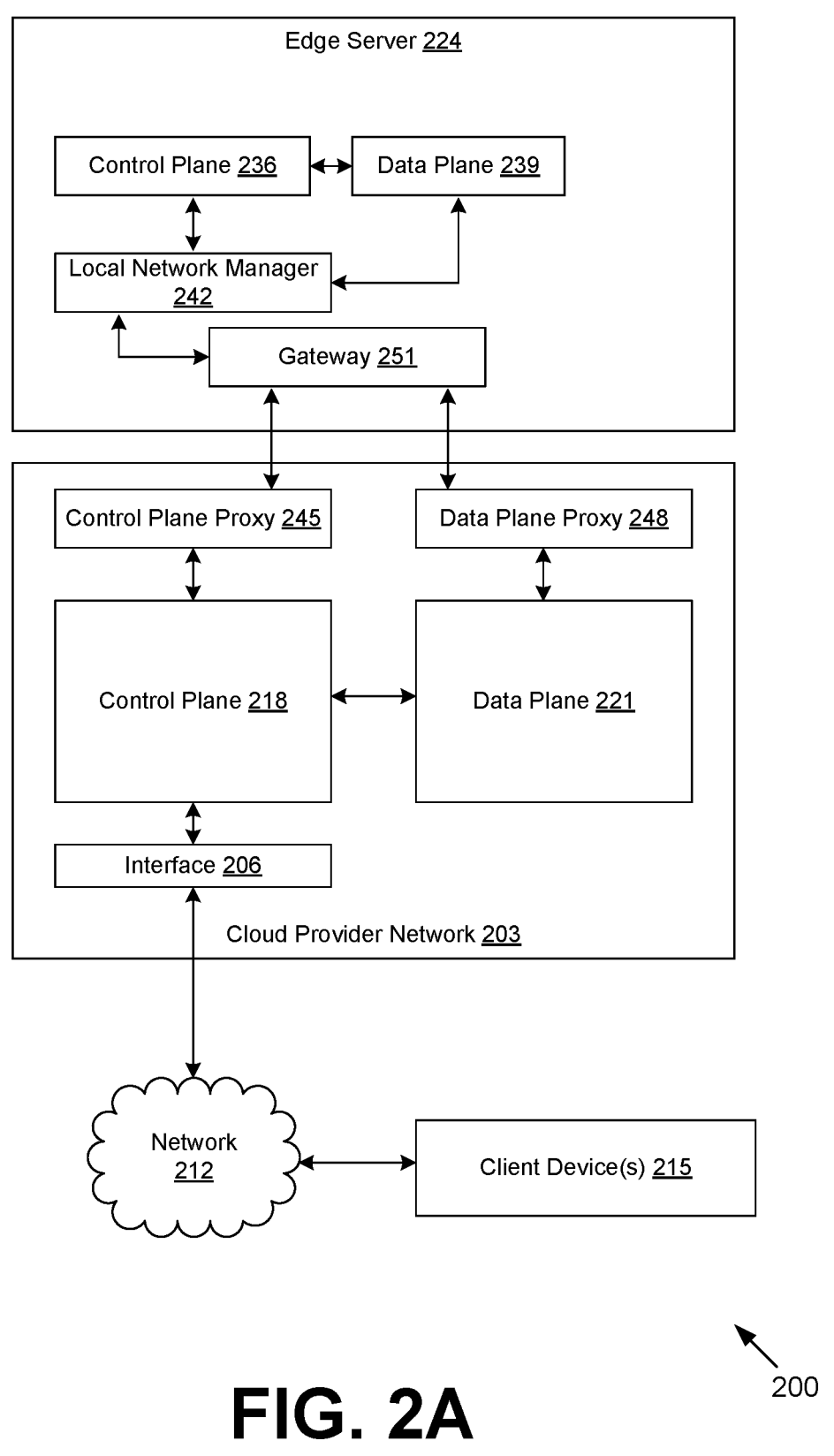

Edge Server 224

Control Plane 236 ⟷ Data Plane 239

Local Network Manager 242

Gateway 251

Control Plane Proxy 245　　Data Plane Proxy 248

Control Plane 218 ⟷ Data Plane 221

Interface 206

Cloud Provider Network 203

Network 212 ⟷ Client Device(s) 215

Start

524 — Determine Excess Capacity on
RAN-Enabled Edge Server

527 — Offer Excess Capacity to Third-Party Cloud Customers
as an Availability Zone 530 — Allocate Resource on Virtual Private Cloud Network of
Third-Party Cloud Customer Using Excess Capacity End

427

624
Determine that RAN-Enabled Edge Server Performing DU Functions for First RAN Has Excess Capacity 627
Determine that RAN-Enabled Edge Server Is Capable of Performing DU Functions for Second RAN 630
Deploy DU Functions for Second RAN on RAN-Enabled Edge Server

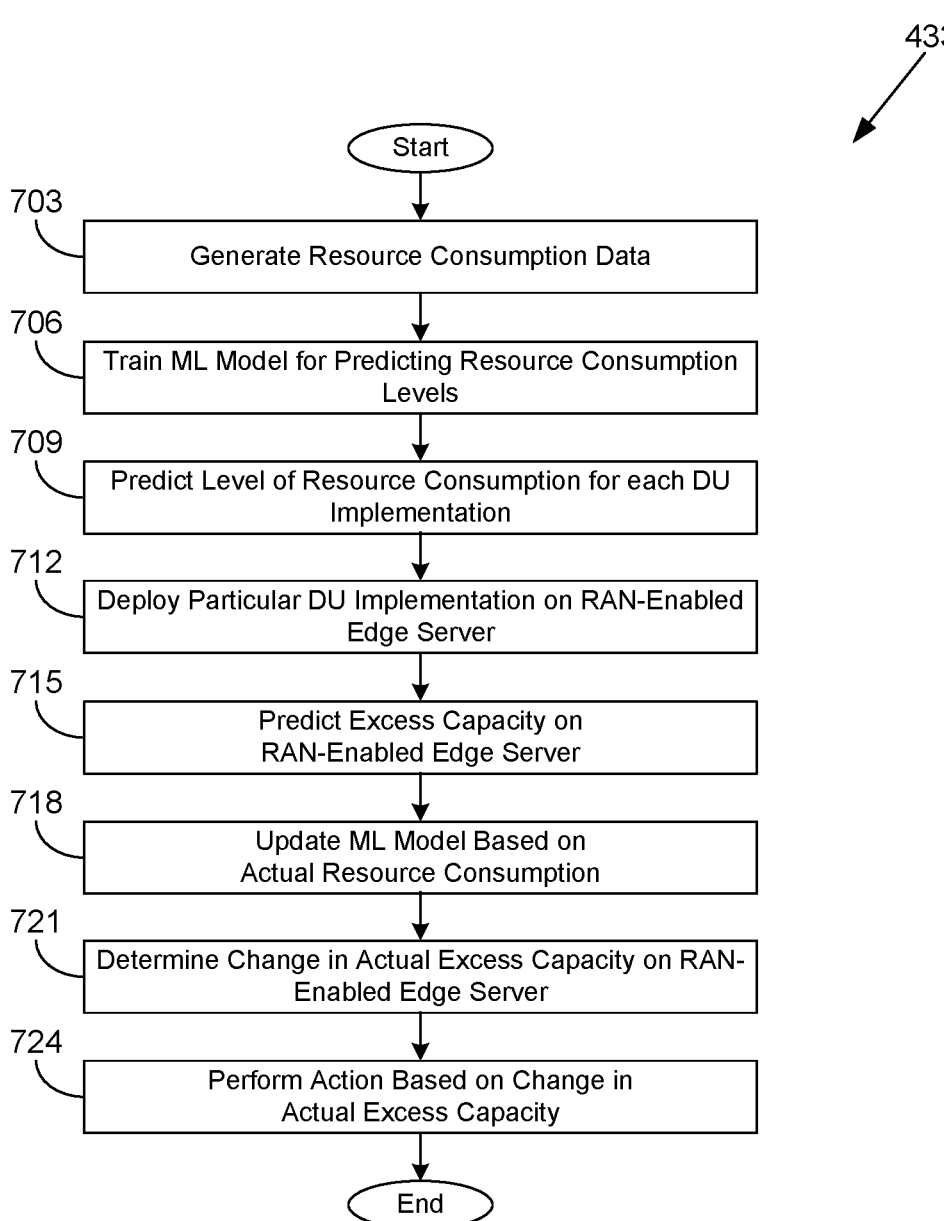

433

703 — Generate Resource Consumption Data

706 — Train ML Model for Predicting Resource Consumption Levels

709 — Predict Level of Resource Consumption for each DU Implementation

712 — Deploy Particular DU Implementation on RAN-Enabled Edge Server

715 — Predict Excess Capacity on RAN-Enabled Edge Server

718 — Update ML Model Based on Actual Resource Consumption

721 — Determine Change in Actual Excess Capacity on RAN-Enabled Edge Server

724 — Perform Action Based on Change in Actual Excess Capacity

FIG. 7

PREDICTING EXCESS CAPACITY FOR RADIO ACCESS NETWORK EDGE SYSTEMS

BACKGROUND 5G is the fifth-generation technology standard for broadband cellular networks, which is planned eventually to take the place of the fourth-generation (4G) standard of Long-Term Evolution (LTE). 5G technology will offer greatly increased bandwidth, thereby broadening the cellular market beyond smartphones to provide last-mile connectivity to desktops, set-top boxes, laptops, Internet of Things (IoT) devices, and so on. Some 5G cells may employ frequency spectrum similar to that of 4G, while other 5G cells may employ frequency spectrum in the millimeter wave band. 5G networks can provide much faster download and upload speeds compared to 4G. This enables quicker and more efficient data communication, making activities such as streaming high-definition videos and downloading large files faster.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2A illustrates an example of a networked environment including a cloud provider network and further including various edge servers of the cloud provider network, which may be used in various locations within the communication network of FIG. 1, according to some embodiments of the present disclosure.

FIGS. 5A-6A are flowcharts illustrating examples of functionality implemented as portions of an availability zone management service executed in a computing environment in the networked environment of FIG. 4 according to various embodiments of the present disclosure.

FIG. 7 is a flowchart illustrating an example of functionality implemented as portions of an excess capacity prediction service executed in a computing environment in the networked environment of FIG. 4 according to various embodiments of the present disclosure.

DETAILED DESCRIPTION

Figure 1:
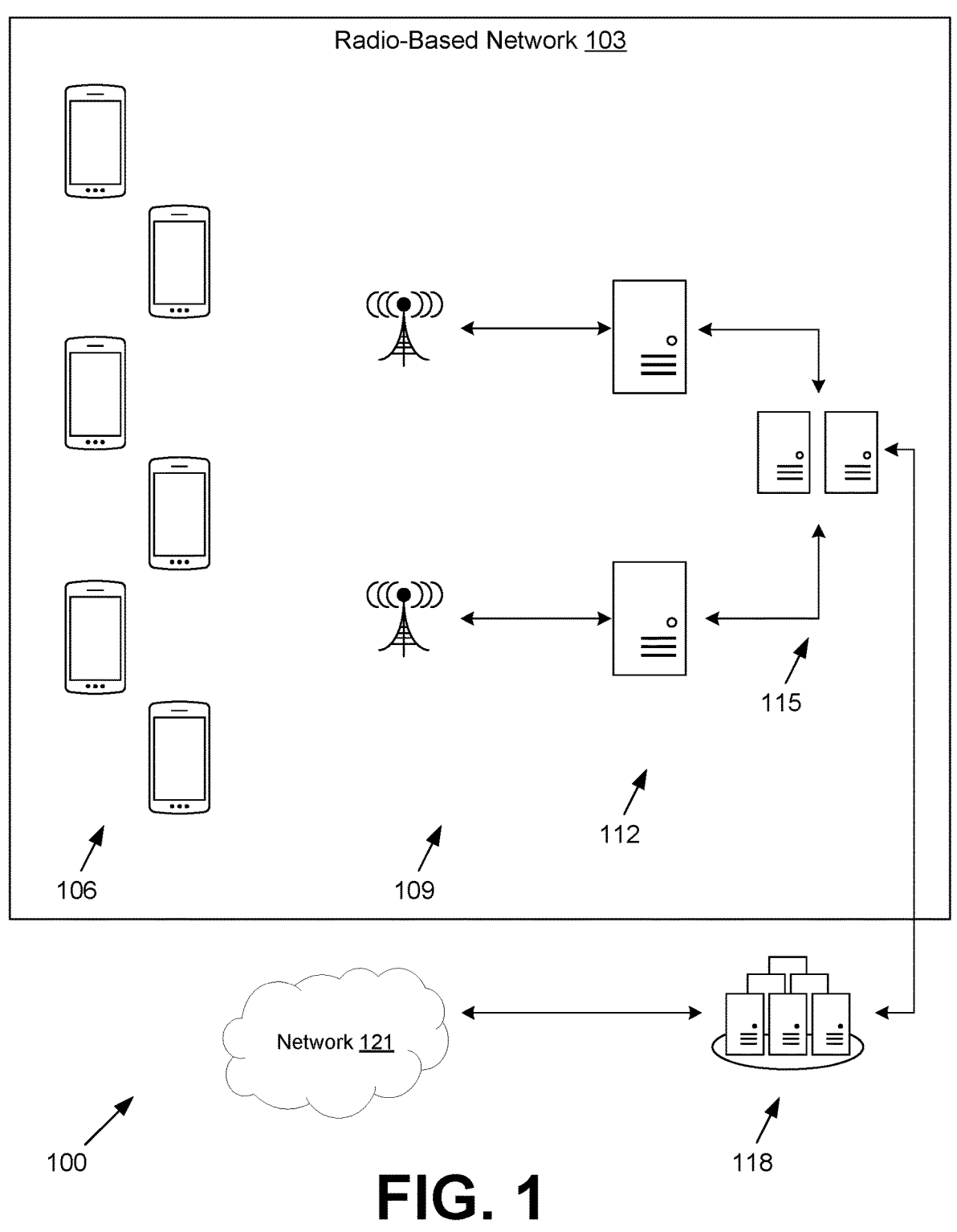
FIG. 1 is a drawing of an example of a communication network that is deployed and managed according to various embodiments of the present disclosure.

The present disclosure relates generally to predicting, managing, and using excess capacity in cloud computing systems located at or near cell sites in radio-based networks. Distributed units (DUs) are computing devices that are typically deployed at cell sites of radio access networks (RANs) in radio-based networks. DUs operate at the lower layers of the RAN protocol stack, such as the Radio Link Control (RLC) sublayer, the Medium Access Control (MAC) sublayer, and the physical layer. This is in contrast to centralized units (CUs), which may be deployed at centralized locations and provide support for higher layers of the protocol stack, such as the Service Data Adaptation Protocol (SDAP), the Packet Data Convergence Protocol (PDCP), and the Radio Resource Control (RRC) protocol. Together, the DU and CU may correspond to the next generation node B (gNB) in 5G, which enables user equipment (UEs) to connect to the core network. The DUs interface with one or more radio units (RUs) in order to communicate wirelessly with the UEs.

In contrast to CU functions and core network functions, DU functions may be considered highly latency sensitive. To minimize latency, the DUs may be hosted on edge servers of a cloud provider network located at or near the cell site. In some cases, these RAN-enabled edge servers that host DU functions may include specialized hardware, such as Layer 1 accelerator devices, to efficiently perform physical layer data processing for the RAN. The RAN-enabled edge servers may have a number of processor cores, such as 64 cores, but the DU may utilize only a quarter to a half of the total number of cores. In some scenarios, the Layer 1 accelerator devices may also be utilized to a level under maximum capacity.

Various embodiments of the present disclosure introduce approaches for using the excess capacity in a RAN-enabled edge server. In some embodiments, a dynamic cellular availability zone may be created using the excess computational capacity from one or more RAN-enabled edge servers at one or more proximal locations. Capacity in these far-edge availability zones may be offered to third-party customers of the cloud provider network to execute virtual machine instances, containers, and/or serverless compute functions. The capacity may be viewed as generic additional capacity in a region of a cloud provider network, or based upon demand, may be offered at a premium for users who require their workloads to be executed within a specified geographic distance to minimize latency. For example, in some implementations, this far-edge availability zone capacity may be provided (at least in part) to the server-side components of applications that also have a client-side component running on user equipment (UE), such as gaming applications, IoT applications, web applications, and the like, which have maximum latency parameters that require placement of the server-side component as close as possible within the network to the client-side component. In some scenarios, the capacity of a RAN-enabled edge server may be made available to multiple communication service providers (CSPs) for their respective DU and/or CU functions where the CSPs share a cell site facility or are located at cell site facilities in close proximity to each other.

In some embodiments, a predictive analysis may be performed on different implementations of DU functions to ascertain a maximum load in terms of processor usage, memory usage, and storage usage for a RAN-enabled edge server. This predictive analysis may leverage artificial intelligence and/or machine learning techniques based upon inputs such as spectrum assignments for a cell site or population in an area. With the maximum DU load being calculated, the remaining capacity can be offered for use in a far-edge availability zone. In some cases, the far-edge availability zone may be dynamically designated to include capacity at potentially multiple cell site locations in a geographic area. In absence of sufficient demand, in some cases, the RAN-enabled edge server may be configured to disable unused hardware, such as cores or accelerators, to conserve energy and reduce operational costs.

The radio-based network may use a network infrastructure that may be provisioned dynamically and used in conjunction with one or more RANs operated by a cloud provider network and/or a plurality of CSPs. While the radio-based networks may be provisioned on-demand, the radio-based networks may also be scaled up or down or terminated dynamically. Further, cell sites may be added to or removed from the radio-based network dynamically on demand. In various scenarios, an organization may create either a private radio-based network for internal use only or a radio-based network open to third-party customers using embodiments of the present disclosure.

Previous deployments of radio-based networks have relied upon manual deployment and configuration at each step of the process. This proved to be extremely time consuming and expensive. Further, in previous generations, software was inherently tied to vendor-specific hardware, thereby preventing customers from deploying alternative software. By contrast, with 5G, hardware is decoupled from the software stack, which allows more flexibility, and allows components of the radio-based network to be executed on cloud provider infrastructure. Using a cloud delivery model for a radio-based network, such as a 5G network, can facilitate handling network traffic from hundreds up to billions of connected devices and compute-intensive applications, while delivering faster speeds, lower latency, and more capacity than other types of networks. A "cloud delivery model" refers to one or both of a mobile network core or RAN being deployed on hardware that is owned and managed by the cloud provider, which can be located at or near cell sites (as with the RAN-enabled edge servers described herein) or may be located in traditional cloud regions or edge capacity pools such as local zones (e.g., for less latency sensitive components like the network core).

The disclosed service can provide a far-edge availability zone on a RAN-enabled edge server to run customer workloads within a cloud provider network. This availability zone can be connected to and effectively part of a broader regional zone, and allows the customer to manage the availability zone using the same APIs and tools as used in the cloud provider network. The availability zone can be assigned a virtual private network subnet. An API can be used to create and assign subnets to all zones that the customer wishes to use, including the private zone and existing other zones. A management console may offer a simplified process for creating a far-edge availability zone. Virtual machine instances and containers can be launched in the far-edge availability zone just as in regional zones. Customers can configure a network gateway to define routes, assign IP addresses, set up network address translation (NAT), and so forth. Automatic scaling can be used to scale the capacity of virtual machine instances or containers as needed in the far-edge availability zone. The same management and authentication APIs of the cloud provider network can be used within the far-edge availability zone. In some cases, since cloud services available in the regional zone can be accessed remotely from far-edge availability zones over a secure connection, these cloud services can be accessed without having to upgrade or modify the local deployment.

Various embodiments of the present disclosure may also bring the concept of elasticity and utility computing from the cloud computing model to radio-based networks and associated core networks. For example, the disclosed techniques can run core and radio access network functions and associated control plane management functions on cloud provider infrastructure, creating a cloud native core network and/or a cloud native radio access network (RAN). Such core and RAN network functions can be based on the 3rd Generation Partnership Project (3GPP) specifications in some implementations. By providing a cloud-native radio-based network, a customer may dynamically scale its radio-based network based on utilization, latency requirements, and/or other factors. Customers may also configure thresholds to receive alerts relating to radio-based network usage and excess capacity usage of their provisioned infrastructure, in order to more effectively manage provisioning of new infrastructure or deprovisioning of existing infrastructure based on their dynamic networking and workload requirements.

As one skilled in the art will appreciate in light of this disclosure, certain embodiments may be capable of achieving certain advantages, including some or all of the following: (1) improving the functioning of a cloud provider network by allowing for the creation and dynamic definition of far-edge availability zones at cell sites, thereby enabling customer systems proximate to the cell site to execute workloads in the far-edge availability zones at a lower latency; (2) improving the functioning of a cloud provider network by allowing utilization of otherwise underutilized processor cores and other resources of a RAN-enabled edge server; (3) improving the resiliency for edge workloads of a cloud provider network by allowing such workloads to be executed on hardware (e.g., RAN-enabled edge servers) that is normally used only for RAN-related workloads; (4) improving the functioning of RAN-enabled edge servers by enabling DU workloads for multiple CSPs to be executed on a single server; and so forth.

Among the benefits of the present disclosure is the ability to deploy and chain network functions together to deliver an end-to-end service that meets specified constraints and requirements. According to the present disclosure, network functions organized into microservices work together to provide end-to-end connectivity. One set of network functions are part of a radio network, running in cell towers and performing wireless signal to IP conversion. Other network functions run in large data centers performing subscriber related business logic and routing IP traffic to the internet and back. For applications to use the new capabilities of 5G such as low latency communication and reserved bandwidth, both of these types of network functions need to work together to appropriately schedule and reserve wireless spectrum, and perform real time compute and data processing. The presently disclosed techniques may provide edge location hardware (as described further below) integrated with network functions that run across the entire network, from cell sites to Internet break-outs, and orchestrate the network functions to meet required Quality of Service (QoS) constraints. This enables an entirely new set of applications that have strict QoS requirements, from factory-based Internet of Things (IoT), to augmented reality (AR), to virtual reality (VR), to game streaming, to autonomous navigation support for connected vehicles, that previously could not run on a mobile network.

In some embodiments, an "elastic 5G" service provides and manages all of the hardware, software and network functions, required to build a network. In some embodiments, the network functions may be developed and managed by the cloud service provider; however, the described control plane can manage network functions across a range of providers, so that customers can use a single set of APIs to call and manage their choice of network functions on cloud infrastructure. The elastic 5G service beneficially automates the creation of an end-to-end 5G network, from hardware to network functions thus reducing the time to deploy and the operational cost of operating the network. By providing APIs that expose network capabilities, the disclosed elastic 5G service enables applications to simply specify the desired QoS as constraints and then deploys and chains the network functions together to deliver an end-to-end service that meets the specified requirements, thus making it possible to easily build new applications.

The present disclosure describes embodiments relating to the creation and management of a cloud native 5G core and/or a cloud native 5G RAN, and associated control plane components. Cloud native refers to an approach to building and running applications that exploits the advantages of the cloud computing delivery model such as dynamic scalability, distributed computing, and high availability (including geographic distribution, redundancy, and failover). Cloud native refers to how these applications are created and deployed to be suitable for deployment in a public cloud. While cloud native applications can be (and often are) run in the public cloud, they also can be run in an on-premises data center. Some cloud native applications can be containerized, for example, having different parts, functions, or subunits of the application packaged in their own containers, which can be dynamically orchestrated so that each part is actively scheduled and managed to optimize resource utilization. These containerized applications can be architected using a microservices architecture to increase the overall agility and maintainability of the applications.

In a microservices architecture, an application is arranged as a collection of smaller subunits ("microservices") that can be deployed and scaled independently from one another, and which can communicate with one another over a network. These microservices are typically fine-grained, in that they have specific technical and functional granularity, and often implement lightweight communications protocols. The microservices of an application can perform different functions from one another, can be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function, in some examples. The disclosed core and RAN software may follow a microservices architecture such that the described radio-based networks are composed of independent subunits that can be deployed and scaled on demand.

Turning now to FIG. 1, shown is an example of a communication network 100 according to various embodiments of the present disclosure. The communication network 100 includes a radio-based network (RBN) 103, which may correspond to a cellular network such as a fourth-generation (4G) Long-Term Evolution (LTE) network, a fifth-generation (5G) network, a 4G-5G hybrid core with both 4G and 5G RANs, a sixth-generation (6G) network, or another network that provides wireless network access. The radio-based network 103 may be operated for an enterprise, a non-profit, a school system, a governmental entity, a communication service provider, or another organization. The radio-based network 103 may use private network addresses or public network addresses in various embodiments.

Various deployments of the radio-based network 103 can include one or more of a core network and a RAN network, as well as a control plane for running the core and/or RAN network at least partly on cloud provider infrastructure. As described above, these components can be developed in a cloud native fashion, for example using a microservices architecture, such that centralized control and distributed processing is used to scale traffic and transactions efficiently. These components may be based on the 3GPP specifications by following an application architecture in which control plane and user plane processing is separated (CUPS Architecture).

The radio-based network 103 provides wireless network access to a plurality of wireless devices 106, which may be mobile devices or fixed location devices. In various examples, the wireless devices 106 may include smartphones, connected vehicles, IoT devices, sensors, machinery (such as in a manufacturing facility), hotspots, and other devices. The wireless devices 106 are sometimes referred to as UE or customer premises equipment (CPE).

The radio-based network 103 can include capacity provisioned on one or more RANs that provide the wireless network access to the plurality of wireless devices 106 through a plurality of cells 109. The RANs may be operated by a cloud network provider or different communication service providers. Each of the cells 109 may be equipped with one or more antennas and one or more radio units that send and receive wireless data signals to and from the wireless devices 106. The antennas may be configured for one or more frequency bands, and the radio units may also be frequency agile or frequency adjustable. The antennas may be associated with a certain gain or beamwidth in order to focus a signal in a particular direction or azimuthal range, potentially allowing reuse of frequencies in a different direction. Further, the antennas may be horizontally, vertically, or circularly polarized. In some examples, a radio unit may utilize multiple-input, multiple-output (MIMO) technology to send and receive signals. As such, the RAN implements a radio access technology to enable radio connection with wireless devices 106, and provides connection with the radio-based network's core network. Components of the RAN include a base station and antennas that cover a given physical area, as well as required core network items for managing connections to the RAN.

Data traffic is often routed through a fiber transport network consisting of multiple hops of layer 3 routers (e.g., at aggregation sites) to the core network. The core network is typically housed in one or more data centers. The core network typically aggregates data traffic from end devices, authenticates subscribers and devices, applies personalized policies, and manages the mobility of the devices before routing the traffic to operator services or the Internet. A 5G Core for example can be decomposed into a number of microservice elements with control and user plane separation. Rather than physical network elements, a 5G Core can comprise virtualized, software-based network functions (deployed for example as microservices) and can therefore be instantiated within Multi-access Edge Computing (MEC) cloud infrastructures. The network functions of the core network can include a User Plane Function (UPF), Access and Mobility Management Function (AMF), and Session Management Function (SMF), described in more detail below. For data traffic destined for locations outside of the communication network 100, network functions typically include a firewall through which traffic can enter or leave the communication network 100 to external networks such as the Internet or a cloud provider network. Note that in some embodiments, the communication network 100 can include facilities to permit traffic to enter or leave from sites further downstream from the core network (e.g., at an aggregation site or radio-based network 103).

The UPF provides an interconnect point between the mobile infrastructure and the Data Network (DN), i.e. encapsulation and decapsulation of General Packet Radio Service (GPRS) tunneling protocol for the user plane (GTP-U). The UPF can also provide a session anchor point for providing mobility within the RAN, including sending one or more end marker packets to the RAN base stations. The UPF can also handle packet routing and forwarding, including directing flows to specific data networks based on traffic matching filters. Another feature of the UPF includes per-flow or per-application QoS handling, including transport level packet marking for uplink (UL) and downlink (DL), and rate limiting. The UPF can be implemented as a cloud native network function using modern microservices methodologies, for example being deployable within a serverless framework (which abstracts away the underlying infrastructure that code runs on via a managed service).

The AMF can receive the connection and session information from the wireless devices 106 or the RAN and can handle connection and mobility management tasks. For example, the AMF can manage handovers between base stations in the RAN. In some examples the AMF can be considered as the access point to the 5G core, by terminating certain RAN control plane and wireless device 106 traffic. The AMF can also implement ciphering and integrity protection algorithms.

The SMF can handle session establishment or modification, for example by creating, updating and removing Protocol Data Unit (PDU) sessions and managing session context within the UPF. The SMF can also implement Dynamic Host Configuration Protocol (DHCP) and IP Address Management (IPAM). The SMF can be implemented as a cloud native network function using modern microservices methodologies.

Various network functions to implement the radio-based network 103 may be deployed in distributed computing devices 112, which may correspond to computing devices configured to perform DU functions. For example, the distributed computing devices 112 may execute one or more virtual machine instances that are configured in turn to execute one or more services that perform the network functions. In one embodiment, the distributed computing devices 112 are ruggedized machines that are deployed at each cell site. The distributed computing devices 112 may be operated as an extension of a cloud provider network, with DU functions being executed, for example, by a container cluster upon the distributed computing devices 112. Further, the distributed computing devices 112 may be managed by the cloud provider network.

By contrast, one or more centralized computing devices 115 may perform various network functions at a central site operated by the customer. For example, the centralized computing devices 115 may be centrally located on premises of the customer in a conditioned server room. The centralized computing devices 115 may execute one or more virtual machine instances that are configured in turn to execute one or more services that perform the network functions. In some cases, the centralized computing devices 115 may be located in a data center of a cloud provider network, rather than upon a customer's premises. In some scenarios, the functions of the centralized computing devices 115 may be performed at the cell site, in the same hardware as the distributed computing devices 112, or in different hardware.

In one or more embodiments, network traffic from the radio-based network 103 is backhauled to one or more core computing devices 118 that may be located at one or more data centers situated remotely from the customer's site. The core computing devices 118 may also perform various network functions, including routing network traffic to and from the network 121, which may correspond to the Internet and/or other external public or private networks. The core computing devices 118 may perform functionality related to the management of the communication network 100 (e.g., billing, mobility management, etc.) and transport functionality to relay traffic between the communication network 100 and other networks. The core network sits between the RAN and external networks, such as the Internet and the public switched telephone network, and performs features such as authentication of UE, secure session management, user accounting, and handover of mobile UE between different RAN sites.

Collectively, the radio unit (RU), distributed unit (DU), and central unit (CU) convert the analog radio signal received from the antenna into a digital packet that can be routed over a network, and similarly they convert digital packets into radio signals that can be transmitted by the antenna. This signal transformation is accomplished by a sequence of network functions which can be distributed amongst the RU, DU, and CU in various ways to achieve different balances of latency, throughput, and network performance. These are referred to as "functional splits" of the RAN.

The network functions implemented in the RAN correspond to the lowest three network layers in the seven-layer OSI model of computer networking. The physical Layer, PHY, or layer 1 (L1) is the first and lowest layer in the OSI model. In a radio-based network 103, the PHY is the layer that sends and receives radio signals. This can be split into two portions: a "high PHY" and "low PHY." Each of these can be considered a network function. The high PHY converts binary bits into electrical pulses that represent the binary data, and the low PHY then converts these electric pulses into radio waves to be transmitted wirelessly by the antennae. The PHY similarly converts received radio waves into a digital signal. This layer may be implemented by a specialized PHY chip.

The PHY interfaces with the data link layer-layer 2 (L2) in the OSI model. The primary task of the L2 is to provide an interface between the higher transport layers and the PHY. The 5G L2 has three sublayers: media access control (MAC), Radio Link Control (RLC), and Packet Data Convergence Protocol (PDCP). Each of these can be considered a network function. The PDCP provides security of radio resource control (RRC) traffic and signaling data, sequence numbering and sequential delivery of RRC messages and IP packets, and IP packet header compression. The RLC protocol provides control of the radio link. The MAC protocol maps information between logical and transport channels.

The data link layer interfaces with layer 3 (L3) in the OSI model, the network layer. The 5G L3 is also referred to as the Radio Resource Control (RRC) layer and is responsible for functions such as packet forwarding, quality of service management, and the establishment, maintenance, and release of a RRC connection between the UE and RAN.

Various functional splits can be chosen for a RAN. The functional splits define different sets of the L1 and L2 functions which are run on the RU versus on the CU and DU. The L3 is also run on the CU. In a RAN architecture following split 7, for example, the functionality of the baseband unit (BBU) used in previous wireless network generations is split into two functional units: the DU which is responsible for real time L1 and L2 scheduling functions, and the CU which is responsible for non-real time, higher L2 and L3 functions. By contrast, in a RAN architecture following split 2, for example, only the PDCP from L2 is handled by the DU and CU, while RLC, MAC, PHY, and radio-frequency signals (RF) are handled by the RU. In split 5, for example, the DU and CU handle PDCP, RLC, and part of the MAC functions, while the RU handles part of the MAC as well as PHY and RF. In split 6, for example, the DU and CU handle PDCP, RLC, MAC, and the RU handles only PHY and RF. In split 8, for example, the DU and CU handle PDCP, RLC, MAC, and PHY, while the RU handles just RF.

FIG. 2A illustrates an example of a networked environment 200 including a cloud provider network 203 and further including various edge servers of the cloud provider network 203, which may be used in combination with on-premise customer deployments within the communication network 100 of FIG. 1, according to some embodiments. A cloud provider network 203 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. While FIG. 2A depicts control planes and data planes in the context of a cloud provider network 203 supporting edge servers, it is understood that a radio-based network 103 may have a respective control plane for operating the radio-based network 103 and a respective data plane for the network traffic on the radio-based network 103 that are distinct from the control planes and data planes shown in FIG. 2A. The control plane of the cloud provider network 203 may perform the operations required to run the services that host customer workloads such as the radio-based network 103, with the cloud provider data plane referring to the resources on which the customer workload runs. As such, the control and data planes of the radio-based network 103 may both run in the data plane of the cloud provider network 203.

The cloud provider network 203 can provide on-demand, scalable computing platforms to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users can connect to virtualized computing devices and other cloud provider network 203 resources and services, and configure and manage telecommunications networks such as 5G networks, using various interfaces 206 (e.g., APIs) via intermediate network(s) 212. An API refers to an interface 206 and/or communication protocol between a client device 215 and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network 203, enabling the development of applications that interact with resources and services hosted in the cloud provider network 203. APIs can also enable different services of the cloud provider network 203 to exchange data with one another. Users can choose to deploy their virtual computing systems to provide network-based services for their own use and/or for use by their customers or clients.

The cloud provider network 203 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 203, for example it may not be possible to route from a substrate network address to an address in a production network that runs services of the cloud provider, or to a customer network that hosts customer resources.

The cloud provider network 203 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 203. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network 203 for routing packets between endpoints.

As illustrated, the traffic and operations of the cloud provider network substrate may broadly be subdivided into two categories in various embodiments: control plane traffic carried over a logical control plane 218 and data plane operations carried over a logical data plane 221. While the data plane 221 represents the movement of user data through the distributed computing system, the control plane 218 represents the movement of control signals through the distributed computing system. The control plane 218 generally includes one or more control plane components or services distributed across and implemented by one or more control servers. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 221 includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some embodiments, control plane traffic and data plane traffic can be supported by different protocols. In some embodiments, messages (e.g., packets) sent over the cloud provider network 203 include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane 221 can include one or more compute servers, which may be bare metal (e.g., single tenant) or may be virtualized by a hypervisor to run multiple VMs (sometimes referred to as "instances") or microVMs for one or more customers. These compute servers can support a virtualized computing service (or "hardware virtualization service") of the cloud provider network 203. The virtualized computing service may be part of the control plane 218, allowing customers to issue commands via an interface 206 (e.g., an API) to launch and manage compute instances (e.g., VMs, containers) for their applications. The virtualized computing service may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 221 can also include one or more block store servers, which can include persistent storage for storing volumes of customer data as well as software for managing these volumes. These block store servers can support a managed block storage service of the cloud provider network 203. The managed block storage service may be part of the control plane 218, allowing customers to issue commands via the interface 206 (e.g., an API) to create and manage volumes for their applications running on compute instances. The block store servers include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 221 can also include one or more object store servers, which represent another type of storage within the cloud provider network. The object storage servers include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

An edge server 224 provides resources and services of the cloud provider network 203 within a separate network, such as a telecommunications network, thereby extending functionality of the cloud provider network 203 to new locations (e.g., for reasons related to latency in communications with customer devices, legal compliance, security, etc.). In some implementations, an edge server 224 can be configured to provide capacity for cloud-based workloads to run within the telecommunications network. In some implementations, an edge server 224 can be configured to provide the core and/or RAN functions of the telecommunications network, and may be configured with additional hardware (e.g., radio access hardware). Some implementations may be configured to allow for both, for example by allowing capacity unused by core and/or RAN functions to be used for running cloud-based workloads.

Edge servers 224 can include cloud provider network-managed edge servers 224 (e.g., formed by servers located in a cloud provider-managed facility separate from those associated with the cloud provider network 203), communications service provider-managed edge servers 224 (e.g., formed by servers associated with communications service provider facilities), customer-managed edge servers 224 (e.g., formed by servers located on-premise in a customer or partner facility), among other possible types of edge servers 224.

As illustrated in the example edge server 224, an edge server 224 can similarly include a logical separation between a control plane 236 and a data plane 239, respectively extending the control plane 218 and data plane 221 of the cloud provider network 203. The edge server 224 may be pre-configured, e.g. by the cloud provider network operator, with an appropriate combination of hardware with software and/or firmware elements to support various types of computing-related resources, and to do so in a manner that mirrors the experience of using the cloud provider network 203. For example, one or more location servers can be provisioned by the cloud provider for deployment within an edge server 224. As described above, the cloud provider network 203 may offer a set of predefined instance types, each having varying types and quantities of underlying hardware resources. Each instance type may also be offered in various sizes. In order to enable customers to continue using the same instance types and sizes in an edge server 224 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other VMs are still running and consuming other capacity of the location servers. This can improve utilization of computing resources within the edge location by allowing for better packing of running instances on servers, and also provides a seamless experience regarding instance usage across the cloud provider network 203 and the edge server 224.

The edge servers 224 can host one or more compute instances. Compute instances can be VMs, or containers that package up code and all its dependencies, so that an application can run quickly and reliably across computing environments (e.g., including VMs and microVMs). In addition, the servers may host one or more data volumes, if desired by the customer. In the region of a cloud provider network 203, such volumes may be hosted on dedicated block store servers. However, due to the possibility of having a significantly smaller capacity at an edge server 224 than in the region, an optimal utilization experience may not be provided if the edge server 224 includes such dedicated block store servers. Accordingly, a block storage service may be virtualized in the edge server 224, such that one of the VMs runs the block store software and stores the data of a volume. Similar to the operation of a block storage service in the region of a cloud provider network 203, the volumes within an edge server 224 may be replicated for durability and availability. The volumes may be provisioned within their own isolated virtual network within the edge server 224. The compute instances and any volumes collectively make up a data plane 239 extension of the provider network data plane 221 within the edge server 224.

The servers within an edge server 224 may, in some implementations, host certain local control plane components, for example, components that enable the edge server 224 to continue functioning if there is a break in the connection back to the cloud provider network 203. Examples of these components include a migration manager that can move compute instances between edge servers 224 if needed to maintain availability, and a key value data store that indicates where volume replicas are located. However, generally the control plane 236 functionality for an edge server 224 will remain in the cloud provider network 203 in order to allow customers to use as much resource capacity of the edge server 224 as possible.

The migration manager may have a centralized coordination component that runs in the region, as well as local controllers that run on the edge servers 224 (and servers in the cloud provider's data centers). The centralized coordination component can identify target edge locations and/or target hosts when a migration is triggered, while the local controllers can coordinate the transfer of data between the source and target hosts. The described movement of the resources between hosts in different locations may take one of several forms of migration. Migration refers to moving virtual machine instances (and/or other resources) between hosts in a cloud computing network, or between hosts outside of the cloud computing network and hosts within the cloud. There are different types of migration including live migration and reboot migration. During a reboot migration, the customer experiences an outage and an effective power cycle of their virtual machine instance. For example, a control plane service can coordinate a reboot migration workflow that involves tearing down the current domain on the original host and subsequently creating a new domain for the virtual machine instance on the new host. The instance is rebooted by being shut down on the original host and booted up again on the new host.

Live migration refers to the process of moving a running virtual machine, container, or application between different physical machines without significantly disrupting the availability of the virtual machine, container, or application (e.g., the down time is not noticeable by the end user). When the control plane executes a live migration workflow it can create a new "inactive" domain associated with the instance, while the original domain for the instance continues to run as the "active" domain. Memory (including any in-memory state of running applications), storage, and network connectivity of the virtual machine are transferred from the original host with the active domain to the destination host with the inactive domain. The virtual machine, container, or application may be briefly paused to prevent state changes while transferring memory contents to the destination host. The control plane can transition the inactive domain to become the active domain and demote the original active domain to become the inactive domain (sometimes referred to as a "flip"), after which the inactive domain can be discarded.

Techniques for various types of migration involve managing the critical phase—the time when the virtual machine instance is unavailable to the customer—which should be kept as short as possible. In the presently disclosed migration techniques this can be especially challenging, as resources are being moved between hosts in geographically separate locations which may be connected over one or more intermediate networks. For live migration, the disclosed techniques can dynamically determine an amount of memory state data to pre-copy (e.g., while the instance is still running on the source host) and to post-copy (e.g., after the instance begins running on the destination host), based for example on latency between the locations, network bandwidth/usage patterns, and/or on which memory pages are used most frequently by the instance. Further, a particular time at which the memory state data is transferred can be dynamically determined based on conditions of the network between the locations. This analysis may be performed by a migration management component in the region, or by a migration management component running locally in the source edge location. If the instance has access to virtualized storage, both the source domain and target domain can be simultaneously attached to the storage to enable uninterrupted access to its data during the migration and in the case that rollback to the source domain is required.

Server software running at an edge server 224 may be designed by the cloud provider to run on the cloud provider substrate network, and this software may be enabled to run unmodified in an edge server 224 by using local network manager(s) 242 to create a private replica of the substrate network within the edge location (a "shadow substrate"). The local network manager(s) 242 can run on edge server 224 servers and bridge the shadow substrate with the edge server 224 network, for example, by acting as a virtual private network (VPN) endpoint or endpoints between the edge server 224 and the proxies 245, 248 in the cloud provider network 203 and by implementing the mapping service (for traffic encapsulation and decapsulation) to relate data plane traffic (from the data plane proxies 248) and control plane traffic (from the control plane proxies 245) to the appropriate server(s). By implementing a local version of the provider network's substrate-overlay mapping service, the local network manager(s) 242 allow resources in the edge server 224 to seamlessly communicate with resources in the cloud provider network 203. In some implementations, a single local network manager 242 can perform these actions for all servers hosting compute instances in an edge server 224. In other implementations, each of the server hosting compute instances may have a dedicated local network manager 242. In multi-rack edge locations, inter-rack communications can go through the local network managers 242, with local network managers maintaining open tunnels to one another.

Edge locations can utilize secure networking tunnels through the edge server 224 network to the cloud provider network 203, for example, to maintain security of customer data when traversing the edge server 224 network and any other intermediate network (which may include the public internet). Within the cloud provider network 203, these tunnels are composed of virtual infrastructure components including isolated virtual networks (e.g., in the overlay network), control plane proxies 245, data plane proxies 248, and substrate network interfaces. Such proxies 245, 248 may be implemented as containers running on compute instances. In some embodiments, each server in an edge server 224 location that hosts compute instances can utilize at least two tunnels: one for control plane traffic (e.g., Constrained Application Protocol (CoAP) traffic) and one for encapsulated data plane traffic. A connectivity manager (not shown) within the cloud provider network 203 manages the cloud provider network-side lifecycle of these tunnels and their components, for example, by provisioning them automatically when needed and maintaining them in a healthy operating state. In some embodiments, a direct connection between an edge server 224 location and the cloud provider network 203 can be used for control and data plane communications. As compared to a VPN through other networks, the direct connection can provide constant bandwidth and more consistent network performance because of its relatively fixed and stable network path.

A control plane (CP) proxy 245 can be provisioned in the cloud provider network 203 to represent particular host(s) in an edge location. CP proxies 245 are intermediaries between the control plane 218 in the cloud provider network 203 and control plane targets in the control plane 236 of edge server 224. That is, CP proxies 245 provide infrastructure for tunneling management API traffic destined for edge servers 224 out of the region substrate and to the edge server 224. For example, a virtualized computing service of the cloud provider network 203 can issue a command to a VMM of a server of an edge server 224 to launch a compute instance. A CP proxy 245 maintains a tunnel (e.g., a VPN) to a local network manager 242 of the edge server 224. The software implemented within the CP proxies 245 ensures that only well-formed API traffic leaves from and returns to the substrate. CP proxies 245 provide a mechanism to expose remote servers on the cloud provider substrate while still protecting substrate security materials (e.g., encryption keys, security tokens) from leaving the cloud provider network 203. The one-way control plane traffic tunnel imposed by the CP proxies 245 also prevents any (potentially compromised) devices from making calls back to the substrate. CP proxies 245 may be instantiated one-for-one with servers at an edge server 224 or may be able to manage control plane traffic for multiple edge servers 224 in the same rack or location.

A data plane (DP) proxy 248 can also be provisioned in the cloud provider network 203 to represent particular server(s) in an edge server 224. The DP proxy 248 acts as a shadow or anchor of the server(s) and can be used by services within the cloud provider network 203 to monitor the health of the host (including its availability, used/free compute and capacity, used/free storage and capacity, and network bandwidth usage/availability). The DP proxy 248 also allows isolated virtual networks to span edge servers 224 and the cloud provider network 203 by acting as a proxy for server(s) in the cloud provider network 203. Each DP proxy 248 can be implemented as a packet-forwarding compute instance or container. As illustrated, each DP proxy 248 can maintain a VPN tunnel with a local network manager 242 that manages traffic to the server(s) that the DP proxy 248 represents. This tunnel can be used to send data plane traffic between the edge servers 224 and the cloud provider network 203. Data plane traffic flowing between an edge server 224 and the cloud provider network 203 can be passed through DP proxies 248 associated with that edge server 224. For data plane traffic flowing from an edge server 224 to the cloud provider network 203, DP proxies 248 can receive encapsulated data plane traffic, validate it for correctness, and allow it to enter into the cloud provider network 203. DP proxies 248 can forward encapsulated traffic from the cloud provider network 203 directly to an edge server 224.

Local network manager(s) 242 can provide secure network connectivity with the proxies 245, 248 established in the cloud provider network 203. After connectivity has been established between the local network manager(s) 242 and the proxies 245, 248, customers may issue commands via the interface 206 to instantiate compute instances (and/or perform other operations using compute instances) using edge server resources in a manner analogous to the way in which such commands would be issued with respect to compute instances hosted within the cloud provider network 203. From the perspective of the customer, the customer can now seamlessly use local resources within an edge server 224 (as well as resources located in the cloud provider network 203, if desired). The compute instances set up on a server at an edge server 224 may communicate both with electronic devices located in the same network, as well as with other resources that are set up in the cloud provider network 203, as desired. A local gateway 251 can be implemented to provide network connectivity between an edge server 224 and a network (e.g., a communications service provider network).

There may be circumstances that necessitate the transfer of data between the object storage service and an edge server 224. For example, the object storage service may store machine images used to launch VMs, as well as snapshots representing point-in-time backups of volumes. The object gateway can be provided on an edge server 224 or a specialized storage device, and provide customers with configurable, per-bucket caching of object storage bucket contents in their edge server 224 to minimize the impact of edge-region latency on the customer's workloads. The object gateway can also temporarily store snapshot data from snapshots of volumes in the edge server 224 and then sync with the object servers in the region when possible. The object gateway can also store machine images that the customer designates for use within the edge server 224 or on the customer's premises. In some implementations, the data within the edge server 224 may be encrypted with a unique key, and the cloud provider can limit keys from being shared from the region to the edge server 224 for security reasons. Accordingly, data exchanged between the object store servers and the object gateway may utilize encryption, decryption, and/or re-encryption in order to preserve security boundaries with respect to encryption keys or other sensitive data. The transformation intermediary can perform these operations, and an edge server bucket can be created (on the object store servers) to store snapshot data and machine image data using the edge server encryption key.

In the manner described above, an edge server 224 forms an edge location, in that it provides the resources and services of the cloud provider network 203 outside of a traditional cloud provider data center and closer to customer devices. An edge location, as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as "local zones," "edge zones," or "distributed cloud edge zones" (due to being near to customer workloads at the "edge" of the network). An edge zone may be connected in various ways to a publicly accessible network such as the Internet, for example directly, via another network, or via a private connection to a region. Although typically an edge zone would have more limited capacity than a region, in some cases an edge zone may have substantial capacity, for example thousands of racks or more. In other embodiments, the edge server 224 may be a part of a separate availability zone that includes one or more edge servers 224 at a single cell site or cell sites relatively near each other.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only by the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone of the provider network. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

In the example of FIG. 1, the distributed computing devices 112 (FIG. 1), the centralized computing devices 115 (FIG. 1), and the core computing devices 118 (FIG. 1) may be implemented as edge servers 224 of the cloud provider network 203. The installation or siting of edge servers 224 within a communication network 100 can vary subject to the particular network topology or architecture of the communication network 100. Edge servers 224 can generally be connected anywhere the communication network 100 can break out packet-based traffic (e.g., IP based traffic). Additionally, communications between a given edge server 224 and the cloud provider network 203 typically securely transit at least a portion of the communication network 100 (e.g., via a secure tunnel, virtual private network, a direct connection, etc.).

In 5G wireless network development efforts, edge locations may be considered a possible implementation of Multi-access Edge Computing (MEC). Such edge locations can be connected to various points within a 5G network that provide a breakout for data traffic as part of the User Plane Function (UPF). Older wireless networks can incorporate edge locations as well. In 3G wireless networks, for example, edge locations can be connected to the packet-switched network portion of a communication network 100, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC). In some embodiments, traffic between an edge server 224 and the cloud provider network 203 can be broken out of the communication network 100 without routing through the core network.

In some embodiments, edge servers 224 can be connected to more than one communication network associated with respective customers. For example, when two communication networks of respective customers share or route traffic through a common point, an edge server 224 can be connected to both networks. For example, each customer can assign some portion of its network address space to the edge server 224, and the edge server 224 can include a router or gateway 251 that can distinguish traffic exchanged with each of the communication networks 100. For example, traffic destined for the edge server 224 from one network might have a different destination IP address, source IP address, and/or virtual local area network (VLAN) tag than traffic received from another network. Traffic originating from the edge server 224 to a destination on one of the networks can be similarly encapsulated to have the appropriate VLAN tag, source IP address (e.g., from the pool allocated to the edge server 224 from the destination network address space) and destination IP address.

Figure 2B:
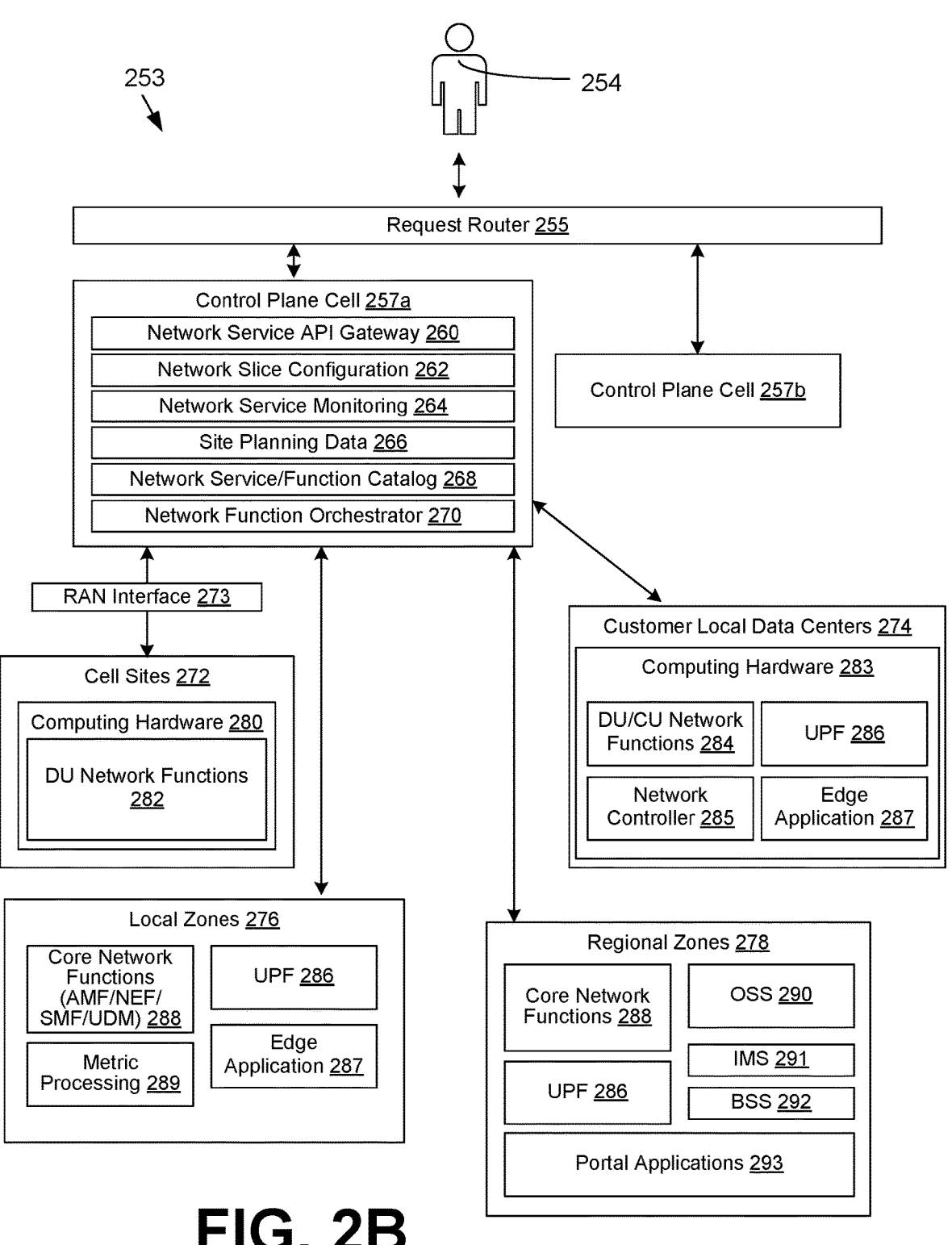
FIG. 2B depicts an example of cellularization and geographic distribution of the communication network of FIG. 1 according to some embodiments of the present disclosure.

FIG. 2B depicts an example 253 of cellularization and geographic distribution of the communication network 100 (FIG. 1) for providing highly available user plane functions (UPFs). In FIG. 2B, a user device 254 communicates with a request router 255 to route a request to one of a plurality of control plane cells 257a and 257b. Each control plane cell 257 may include a network service API gateway 260, a network slice configuration 262, a function for network service monitoring 264, site planning data 266 (including layout, device type, device quantities, etc. that describe a customer's site requirements), a network service/function catalog 268, a function for orchestration 270, and/or other components. The larger control plane can be divided into cells in order to reduce the likelihood that large scale errors will affect a wide range of customers, for example by having one or more cells per customer, per network, or per region that operate independently.

The network service/function catalog 268 is also referred to as the NF Repository Function (NRF). In a Service Based Architecture (SBA) 5G network, the control plane functionality and common data repositories can be delivered by way of a set of interconnected network functions built using a microservices architecture. The NRF can maintain a record of available NF instances and their supported services, allowing other NF instances to subscribe and be notified of registrations from NF instances of a given type. The NRF thus can support service discovery by receipt of discovery requests from NF instances, and details which NF instances support specific services. The network function orchestrator 270 can perform NF lifecycle management including instantiation, scale-out/in, performance measurements, event correlation, and termination. The network function orchestrator 270 can also onboard new NFs, manage migration to new or updated versions of existing NFs, identify NF sets that are suitable for a particular network slice or larger network, and orchestrate NFs across different computing devices and sites that make up the radio-based network 103 (FIG. 1).

The control plane cell 257 may be in communication with one or more cell sites 272 by way of a RAN interface 273, one or more customer local data centers 274, one or more local zones 276, and one or more regional zones 278. The RAN interface 273 may include an application programming interface (API) that facilitates provisioning or releasing capacity in a RAN operated by a third-party communication service provider at a cell site 272. A "cell site" 272 is a local area directly adjacent to a radio tower and/or antenna that includes all equipment necessary to send and/or receive signals. Typically, a cell site 272 includes one or more transmitters, one or more receivers, one or more power amplifiers, one or more combiners, one or more filters, one or more digital signal processors, one or more power supplies, one or more network interface modules, and/or other equipment. Cell sites 272 may include cell tower sites, small cells, outdoor distributed antenna systems, in-building wireless systems, ground mounted sites, and sites on other structures not originally designed to house cell equipment. The cell sites 272 include computing hardware 280 that executes one or more distributed unit (DU) network functions 282. The customer local data centers 274 include computing hardware 283 that execute one or more DU or central unit (CU) network functions 284, a network controller 285, a UPF 286, one or more edge applications 287 corresponding to customer workloads, and/or other components.

The local zones 276, which may be in a data center operated by a cloud service provider, may execute one or more core network functions 288, such as an AMF, an SMF, a network exposure function (NEF) that securely exposes the services and capabilities of other network functions, a unified data management (UDM) function that manages subscriber data for authorization, registration, and mobility management. The local zones 276 may also execute a UPF 286, a service for metric processing 289, and one or more edge applications 287.

The regional zones 278, which may be in a data center operated by a cloud service provider, may execute one or more core network functions 288; a UPF 286; an operations support system (OSS) 290 that supports network management systems, service delivery, service fulfillment, service assurance, and customer care; an internet protocol multimedia subsystem (IMS) 291; a business support system (BSS) 292 that supports product management, customer management, revenue management, and/or order management; one or more portal applications 293, and/or other components.

In this example, the communication network 100 employs a cellular architecture to reduce the blast radius of individual components. At the top level, the control plane is in multiple control plane cells 257 to prevent an individual control plane failure from impacting all deployments.

Within each control plane cell 257, multiple redundant stacks can be provided with the control plane shifting traffic to secondary stacks as needed. For example, a cell site 272 may be configured to utilize a nearby local zone 276 as its default core network. In the event that the local zone 276 experiences an outage, the control plane can redirect the cell site 272 to use the backup stack in the regional zone 278. Traffic that would normally be routed from the internet to the local zone 276 can be shifted to endpoints for the regional zones 278. Each control plane cell 257 can implement a "stateless" architecture that shares a common session database across multiple sites (such as across availability zones or edge sites).

Figure 3A:
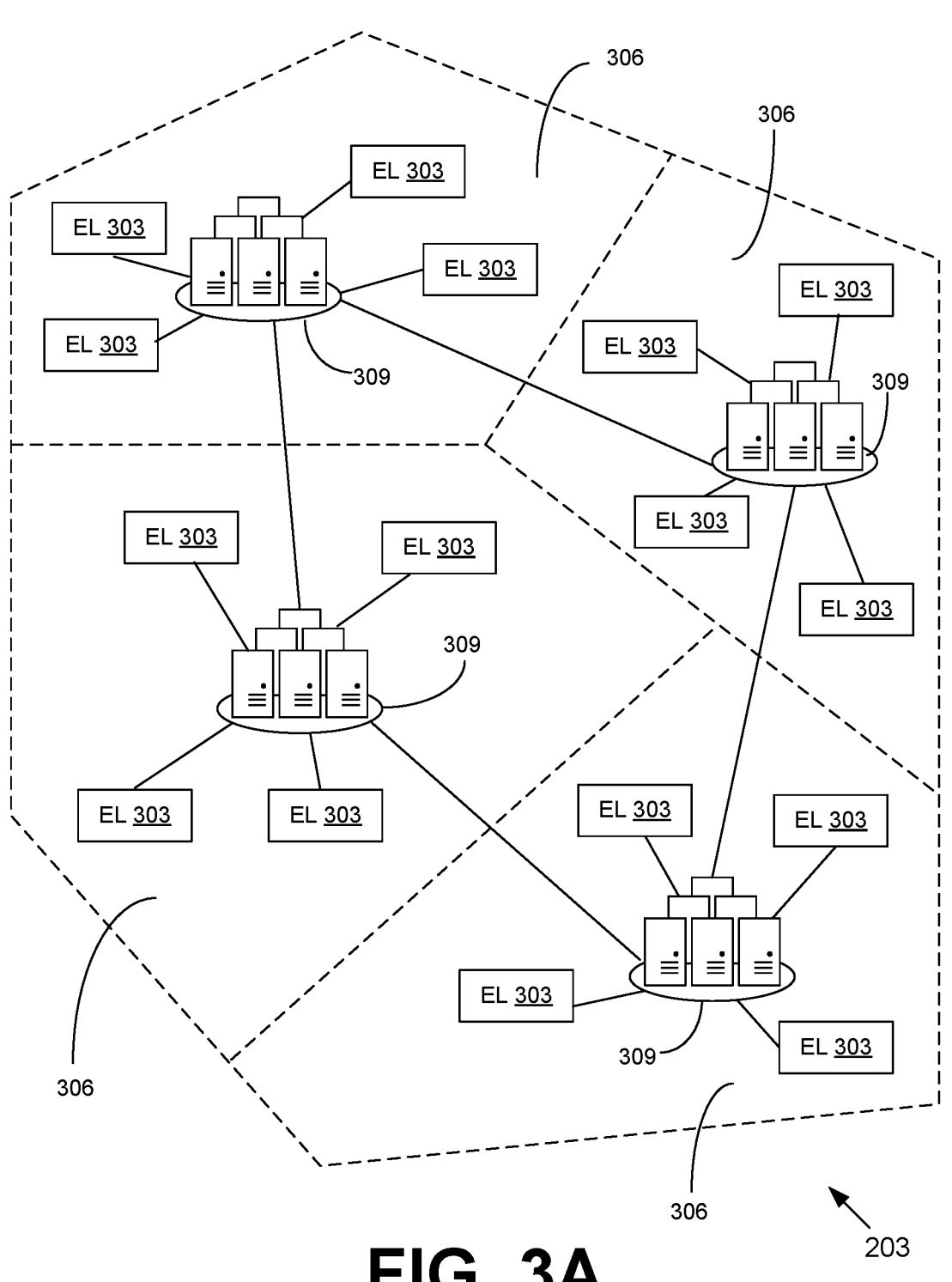
FIG. 3A illustrates an example of the networked environment of FIG. 2A including geographically dispersed edge servers according to some embodiments of the present disclosure.

FIG. 3A illustrates an exemplary cloud provider network 203 including geographically dispersed edge servers 224 (FIG. 2A) (or "edge locations 303") according to some embodiments. As illustrated, a cloud provider network 203 can be formed as a number of regions 306, where a region 306 is a separate geographical area in which the cloud provider has one or more data centers 309. Each region 306 can include two or more availability zones (AZs) connected to one another via a private high-speed network such as, for example, a fiber communication connection. An availability zone refers to an isolated failure domain including one or more data center facilities with separate power, separate networking, and separate cooling relative to other availability zones. A cloud provider may strive to position availability zones within a region 306 far enough away from one another such that a natural disaster, widespread power outage, or other unexpected event does not take more than one availability zone offline at the same time. Customers can connect to resources within availability zones of the cloud provider network 203 via a publicly accessible network (e.g., the Internet, a cellular communication network, a communication service provider network). Transit Centers (TC) are the primary backbone locations linking customers to the cloud provider network 203 and may be co-located at other network provider facilities (e.g., Internet service providers, telecommunications providers). Each region 306 can operate two or more TCs for redundancy. Regions 306 are connected to a global network which includes private networking infrastructure (e.g., fiber connections controlled by the cloud service provider) connecting each region 306 to at least one other region. The cloud provider network 203 may deliver content from points of presence (PoPs) outside of, but networked with, these regions 306 by way of edge locations 303 and regional edge cache servers. This compartmentalization and geographic distribution of computing hardware enables the cloud provider network 203 to provide low-latency resource access to customers on a global scale with a high degree of fault tolerance and stability.

In comparison to the number of regional data centers, the number of edge locations 303 can be much higher. Such widespread deployment of edge locations 303 can provide low-latency connectivity to the cloud for a much larger group of end user devices (in comparison to those that happen to be very close to a regional data center). In some embodiments, each edge location 303 can be peered to some portion of the cloud provider network 203 (e.g., a parent availability zone or regional data center). Such peering allows the various components operating in the cloud provider network 203 to manage the compute resources of the edge location 303. In some cases, multiple edge locations 303 may be sited or installed in the same facility (e.g., separate racks of computer systems) and managed by different zones or data centers 309 to provide additional redundancy. Note that although edge locations 303 are typically depicted herein as within a communication service provider network or a radio-based network 103 (FIG. 1), in some cases, such as when a cloud provider network facility is relatively close to a communications service provider facility, the edge location 303 can remain within the physical premises of the cloud provider network 203 while being connected to the communications service provider network via a fiber or other network link. In other cases, the edge location 303 is located at a cell site, which may be operated by one or more CSPs or a third-party cell site operator.

An edge location 303 can be structured in several ways. In some implementations, an edge location 303 can be an extension of the cloud provider network substrate including a limited quantity of capacity provided outside of an availability zone (e.g., in a small data center 309 or other facility of the cloud provider that is located close to a customer workload and that may be distant from any availability zones). Such edge locations 303 may be referred to as local zones (due to being more local or proximate to a group of users than traditional availability zones). A local zone may be connected in various ways to a publicly accessible network such as the Internet, for example directly, via another network, or via a private connection to a region 306. Although typically a local zone would have more limited capacity than a region 306, in some cases a local zone may have substantial capacity, for example thousands of racks or more. Some local zones may use similar infrastructure as typical cloud provider data centers, instead of the edge location 303 infrastructure described herein.

As indicated herein, a cloud provider network 203 can be formed as a number of regions 306, where each region 306 represents a geographical area in which the cloud provider clusters data centers 309. Each region 306 can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region 306 are positioned far enough away from one another such that a same natural disaster (or other failure-inducing event) should not affect or take more than one AZ offline at the same time. Customers can connect to an AZ of the cloud provider network 203 via a publicly accessible network (e.g., the Internet, a cellular communication network).

The parenting of a given edge location 303 to an AZ or region 306 of the cloud provider network 203 can be based on a number of factors. One such parenting factor is data sovereignty. For example, to keep data originating from a communication network in one country within that country, the edge locations 303 deployed within that communication network can be parented to AZs or regions 306 within that country. Another factor is availability of services. For example, some edge locations 303 may have different hardware configurations such as the presence or absence of components such as local non-volatile storage for customer data (e.g., solid state drives), graphics accelerators, etc. Some AZs or regions 306 might lack the services to exploit those additional resources, thus, an edge location could be parented to an AZ or region 306 that supports the use of those resources. Another factor is the latency between the AZ or region 306 and the edge location 303. While the deployment of edge locations 303 within a communication network has latency benefits, those benefits might be negated by parenting an edge location 303 to a distant AZ or region 306 that introduces significant latency for the edge location 303 to region traffic. Accordingly, edge locations 303 are often parented to nearby (in terms of network latency) AZs or regions 306.

Figure 3B:
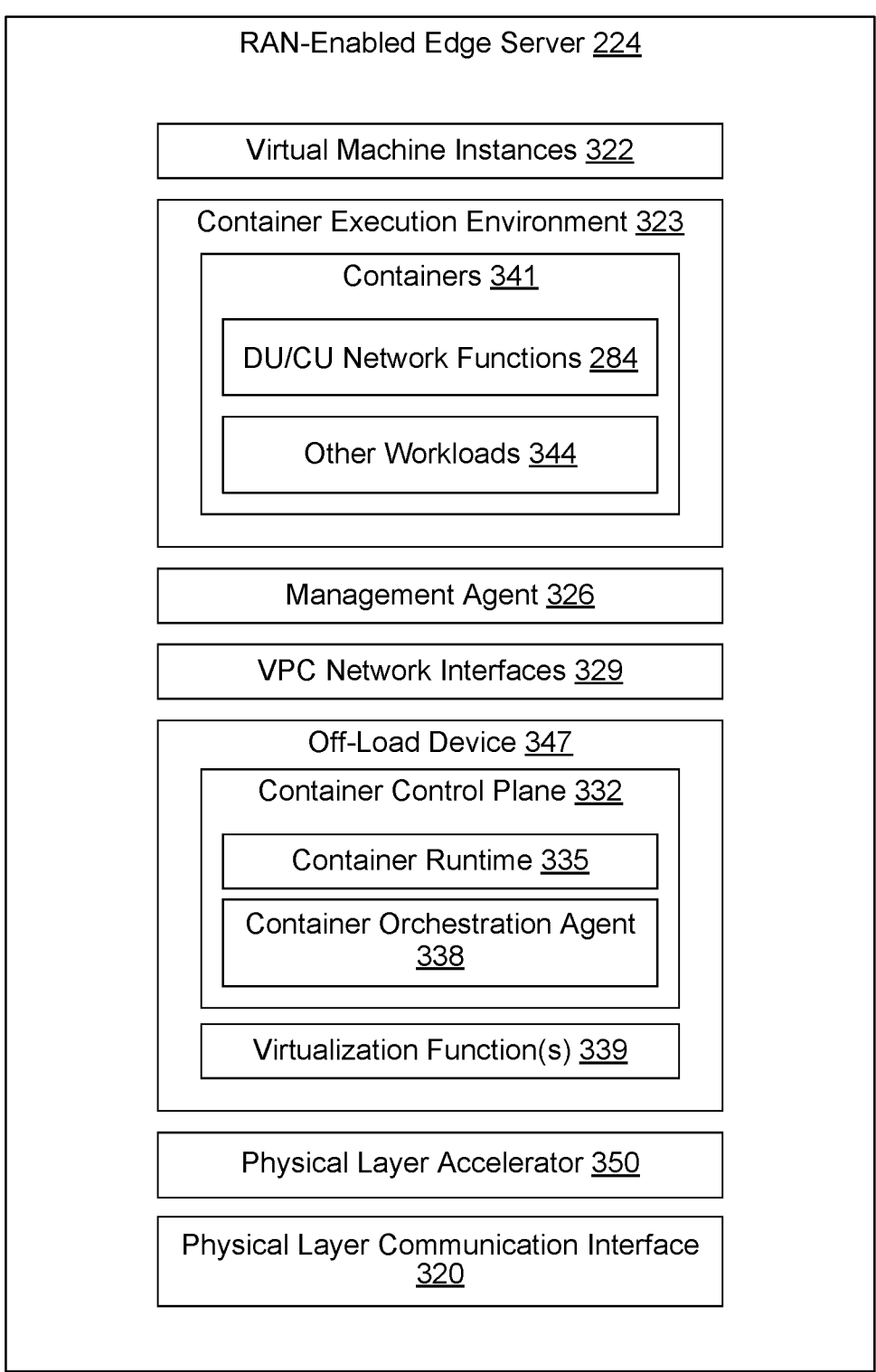
FIG. 3B illustrates an example of a radio access network (RAN)-enabled edge server according to some embodiments of the present disclosure.

Turning now to FIG. 3B, shown is an example of a RAN-enabled edge server 224 according to one or more embodiments. The RAN-enabled edge server 224 may be deployed at an edge location 303 (FIG. 3A), such as a cell site 272 (FIG. 2B), to function as a distributed computing device for a RAN. The RAN-enabled edge server 224 may be connected to one or more radio units (RUs) of the radio-based network 103 (FIG. 1) via a physical layer communication interface 320.

The components executed on the RAN-enabled edge server 224 may include, for example, one or more virtual machine instances 322, a container execution environment 323, a management agent 326, one or more VPC network interfaces 329, a container control plane 332 including a container runtime 335 and a container orchestration agent 338, one or more virtualization functions 339, the physical layer communication interface 320, and/or other components. The virtual machine instances 322 may correspond to virtual machines that execute RAN-related workloads (such as DU function) and/or non-RAN-related workloads, such as workloads of third-party customers different from the operator of the RAN. The container execution environment 323 may be configured to execute a number of different containers 341. In some embodiments, the container execution environment 323 may be executed within a virtual machine instance 322 executed on the RAN-enabled edge server 224.

The containers 341 may include containerized versions of DU network functions 282 that perform the functions of the DU in the radio-based network 103. The containers 341 may also correspond to other workloads 344, which in various examples, may correspond to DU/CU network functions 284 (FIG. 2B), core network functions 288 (FIG. 2B), a UPF 286, and/or other functions or portions thereof relating to the radio-based network 103. The other workloads 344 may also correspond to arbitrary customer workloads that are not involved in implementing the radio-based network 103 but may be latency sensitive. Therefore, such customer workloads may benefit from being executed at the edge location 303 rather than elsewhere in the cloud provider network 203 (FIG. 2A).

A container 341, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers 341 at runtime. Containers 341 are thus an abstraction of the application layer (meaning that each container simulates a different software application process). Though each container 341 runs isolated processes, multiple containers 341 can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers 341 can be run on instances that are running a container agent, and some containers 341 can be run on bare-metal servers.

The virtualization functions 339 may correspond to functions that enable one or more virtual machine instances to be executed on the RAN-enabled edge server 224. To this end, the virtualization functions 339 may correspond to a hypervisor, an operating system in which the hypervisor is executed, and/or other functions. The virtualization functions 339 may also facilitate access to the VPC network interfaces 329 by virtual machine instances and/or containers 341, including performing functions for the VPC network interfaces 329 such as encapsulation, decapsulation, encryption, decryption, and so on.

In some embodiments, the RAN-enabled edge server 224 may include an off-load device 347 and a physical layer accelerator 350. The off-load device 347 and the physical layer accelerator 350 respectively correspond to special-purpose computing hardware in the RAN-enabled edge server 224. The off-load device 347 and the physical layer accelerator 350 may individually have a separate processor and memory by which to execute virtualization or management functions such as the container control plane 332, the virtualization functions 339, and/or the physical layer communication interface 320 so that the container control plane 332 and the physical layer communication interface 320 not use processor and memory resources of the RAN-enabled edge server 224.

In some embodiments, in addition to the physical layer communication interface 320 that optimizes DU to RU Layer 1 communication, the physical layer accelerator 350 may integrate network interface card hardware for one or more inbound and/or outbound network ports. For example, such network ports may correspond to Ethernet ports, fiber optic ports, and so forth.

The RAN-enabled edge server 224 includes one or more processors and one or more memories that are coupled to a local hardware interconnect interface such as a bus. The off-load device 347 and the physical layer accelerator 350 are also coupled to the local hardware interconnect interface, for example, by way of a Peripheral Component Interconnect (PCI) or PCI Express (PCIe) bus. For example, the off-load device 347 and the physical layer accelerator 350 may individually correspond to a physical card that is pluggable into a connector on the bus. The processors of the RAN-enabled edge server 224, the off-load device 347, and the physical layer accelerator 350 may have different processor architectures. For example, one processor may have an x86 architecture, while the other processor may have an ARM architecture. The off-load device 347 and the physical layer accelerator 350 may individually have a memory that is separate from the memory of the RAN-enabled edge server 224.

Non-limiting examples of the container runtime 335 may include containerd, CRI-O, DOCKER, and so on. The container runtime 335 may meet a Runtime Specification of the Open Container Initiative. The container orchestration agent 338 is executed to manage the lifecycle of container 341, including provisioning, deployment, scaling up, scaling down, networking, load balancing, and other functions. Non-limiting examples of commercially available container orchestration agents 338 include KUBERNETES, APACHE MESOS, DOCKER orchestration tools, and so on.

The management agent 326 may be executed to perform management functions for the RAN-enabled edge server 224 on behalf of the cloud service provider or the customer associated with the radio-based network 103. Such functions may include updating versions of the DU/CU network functions 284, shifting other workloads 344 to or from the RAN-enabled edge server 224, updating operating system or virtualization software on the RAN-enabled edge server 224, and/or other functions. In some cases, the management agent 326 may enable live migration. For example, as new or updated versions of the container runtime 335, the container orchestration agent 338, or the DU/CU network functions 284 become available, the management agent 326 may replace the previous versions without rebooting or terminating the affected RAN-enabled edge server 224 or a machine instance executed thereon. In some embodiments, the management agent 326 may be executed in an off-load device 347.

The VPC network interfaces 329 provide connectivity between the DU/CU network functions 284 and DU/CU network functions 284 on other RAN-enabled edge servers 224 via a virtual private cloud network connection. The VPC network interfaces 329 may also provide connectivity between the DU/CU network functions 284 and DU/CU network functions executed by other machine instances or other computing devices in a cloud provider network 203 also using a virtual private cloud network connection. Also, the VPC network interface 329 may provide connectivity between the other workloads 344 or other virtual machine instances 322 and other machine instances or other devices in the cloud provider network 203 using a virtual private cloud network connection.

Figure 3C:
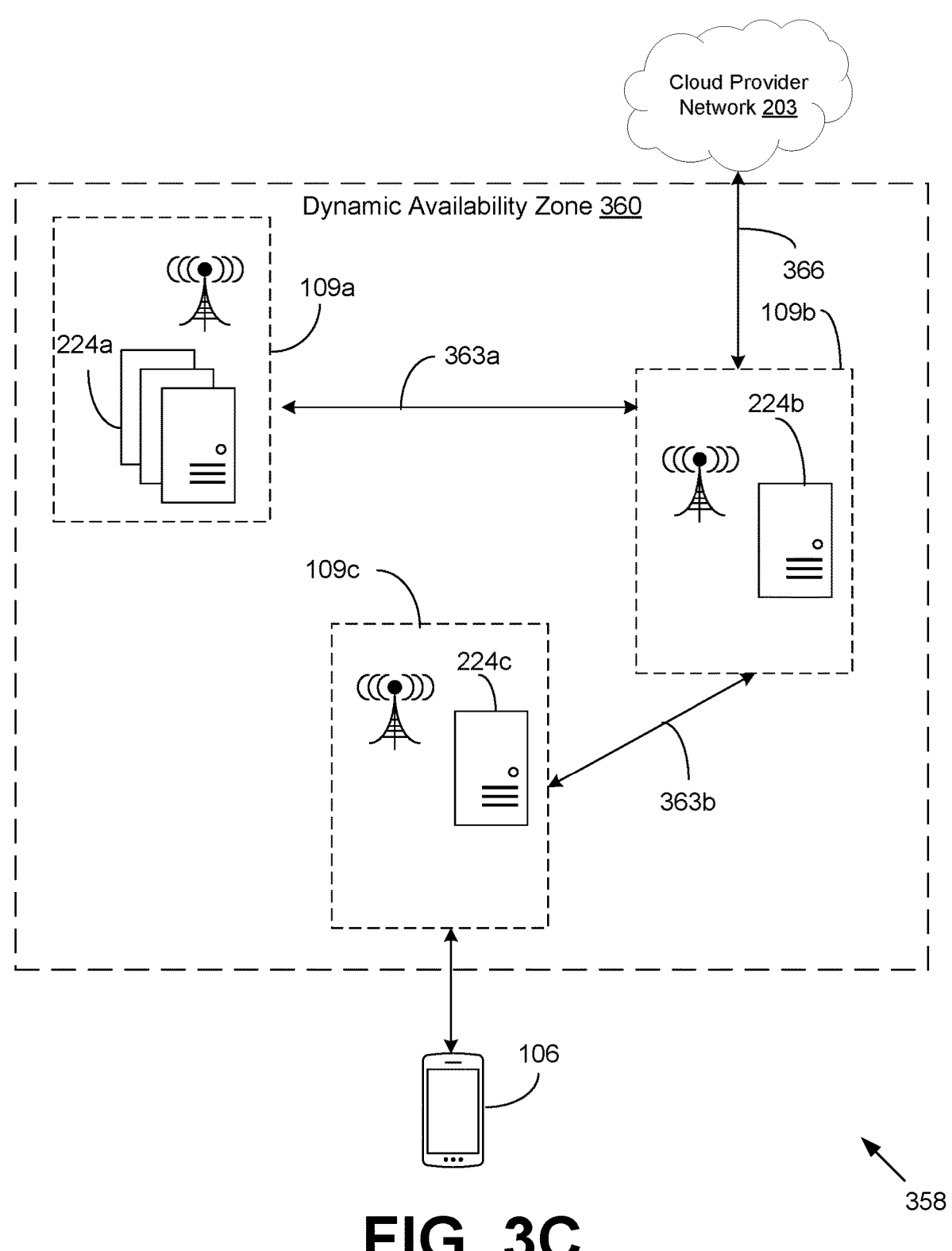
FIG. 3C illustrates an example of a networked environment including a dynamic availability zone according to some embodiments of the present disclosure.

Turning now to FIG. 3C, shown is an example of a networked environment 358 including a dynamic availability zone (AZ) 360 according to various embodiments. In this example, the dynamic AZ 360 includes three cells 109a, 109b, and 109c. The first cell 109a includes multiple RAN-enabled edge servers 224a with excess capacity, the second cell 109b includes a single RAN-enabled edge server 224b with excess capacity, and the third cell 109c includes a single RAN-enabled edge server 224c with excess capacity. Cells 109a and 109b may be linked by an east-west connection 363a, while cells 109b and 109c may be linked with an east-west connection 363b. The east-west connections 363 may traverse a network of the CSP that operates the RANs including the cells 109a, 109b, and 109c. The cell 109b and the other cells 109 may also include a mid-haul or back-haul link to a cloud provider network 203, such as to a region 306 or to a local zone.

When a device 106 desires to execute a workload on the dynamic AZ 360, the workload may be directed to the dynamic AZ 360 instead of other AZs based upon geographic proximity of the cells 109 to the device 106. Similarly, the workload may be more particularly routed to the nearest RAN-enabled edge server 224 in some cases, such as to the RAN-enabled edge server 224c.

Figure 4:
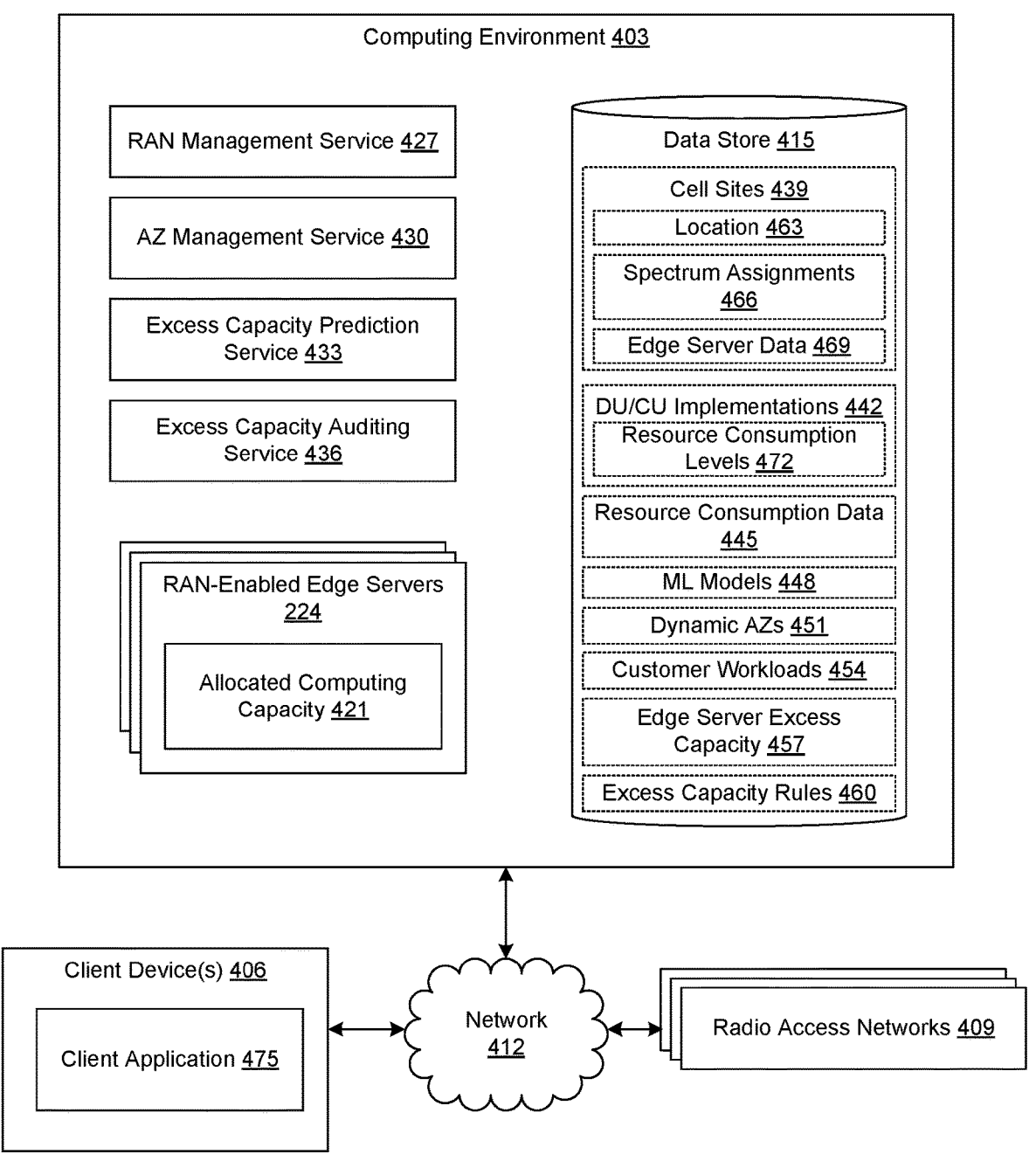
FIG. 4 is a schematic block diagram of the networked environment of FIG. 2A according to various embodiments of the present disclosure.

With reference to FIG. 4, shown is a networked environment 400 according to various embodiments. The networked environment 400 includes a computing environment 403, one or more client devices 406, and one or more radio access networks (RANs) 409, which are in data communication with each other via a network 412. The network 412 includes, for example, the Internet, intranets, extranets, wide area networks (WANs), local area networks (LANs), wired networks, wireless networks, cable networks, satellite networks, or other suitable networks, etc., or any combination of two or more such networks. The RANs 409 may be operated by a plurality of different communication service providers. In some cases, one or more of the RANs 409 may be operated by a cloud provider network 203 (FIG. 2A) or a customer of the cloud provider network 203.

The computing environment 403 may comprise, for example, a server computer or any other system providing computing capacity. Alternatively, the computing environment 403 may employ a plurality of computing devices that may be arranged, for example, in one or more server banks or computer banks or other arrangements. Such computing devices may be located in a single installation or may be distributed among many different geographical locations. For example, the computing environment 403 may include a plurality of computing devices that together may comprise a hosted computing resource, a grid computing resource, and/or any other distributed computing arrangement. In some cases, the computing environment 403 may correspond to an elastic computing resource where the allotted capacity of processing, network, storage, or other computing-related resources may vary over time. For example, the computing environment 403 may correspond to a cloud provider network 203, where customers are billed according to their computing resource usage based on a utility computing model.

In some embodiments, the computing environment 403 may correspond to a virtualized private network within a physical network comprising virtual machine instances executed on physical computing hardware, e.g., by way of a hypervisor. The virtual machine instances and any containers running on these instances may be given network connectivity by way of virtualized network components enabled by physical network components, such as routers and switches.

Various applications and/or other functionality may be executed in the computing environment 403 according to various embodiments. Also, various data is stored in a data store 415 that is accessible to the computing environment 403. The data store 415 may be representative of a plurality of data stores 415 as can be appreciated. The data stored in the data store 415, for example, is associated with the operation of the various applications and/or functional entities described below.

The computing environment 403 as part of a cloud provider network offering utility computing services includes RAN-enabled edge servers 224 and other types of computing devices. The RAN-enabled edge servers 224 may correspond to different types of computing devices and may have different computing architectures. The computing architectures may differ by utilizing processors having different architectures, such as x86, x86_64, ARM, Scalable Processor Architecture (SPARC), PowerPC, and so on. For example, some RAN-enabled edge servers 224 may have x86 processors, while other RAN-enabled edge servers 224 may have ARM processors. The RAN-enabled edge servers 224 may differ also in hardware resources available, such as local storage, graphics processing units (GPUs), hardware accelerators, machine learning extensions, and other characteristics.

The RAN-enabled edge servers 224 may have various forms of allocated computing capacity 421, which may include virtual machine (VM) instances, containers, serverless functions, and so forth. The VM instances may be instantiated from a VM image. To this end, customers may specify that a virtual machine instance should be launched in a particular type of RAN-enabled edge server 224 as opposed to other types of RAN-enabled edge servers 224. In various examples, one VM instance may be executed singularly on a RAN-enabled edge server 224, or a plurality of VM instances may be executed on a particular RAN-enabled edge server 224. Also, a particular RAN-enabled edge server 224 may execute different types of VM instances, which may offer different quantities of resources available via the RAN-enabled edge servers 224. For example, some types of VM instances may offer more memory and processing capability than other types of VM instances.

The components executed on the computing environment 403, for example, include a RAN management service 427, an availability zone (AZ) management service 430, an excess capacity prediction service 433, an excess capacity auditing service 436, and other applications, services, processes, systems, engines, or functionality not discussed in detail herein.

The RAN management service 427 is executed to deploy and manage DU and/or CU network functions 284 (FIG. 3B) on RAN-enabled edge servers 224. In one embodiment, the RAN management service 427 coordinates DU and/or CU management activities via a respective management agent 326 executed on the RAN-enabled edge servers 224. For example, the RAN management service 427 provisions DUs in response to a customer specifying a DU and/or CU group, location, and physical location for the DU and/or CU. The RAN management service 427 may also provision VPC network interfaces 329 to enable connectivity between the DUs and between DUs and CUs. Once the RAN-enabled edge server 224 is powered up, the DU and/or CU network functions 284 may join the RAN 409 and be staged automatically. The RAN management service 427 may also orchestrate container management and live update functions for the RAN-enabled edge servers 224.

The RAN management service 427 may transfer computing capacity from network function workloads to customer workloads, and vice versa. Further, unused computing capacity may be transferred from one customer or one RAN 409 to another. Also, network function workloads may be transferred between RAN-enabled edge servers 224 at cell 109 (FIG. 1) sites, centralized computing devices 115 (FIG. 1) at customer sites, and core computing devices 118 (FIG. 1) at data centers.

The AZ management service 430 is executed to manage availability zones that are deployed using the excess capacity of RAN-enabled edge servers 224. To this end, the AZ management service 430 may facilitate the creation of AZs based upon definitions supplied by customers. The definitions may specify specific cell sites or geographic locations for inclusion or exclusion. For example, an AZ may be created using RAN-enabled edge servers 224 within a 20 km radius of a given location, which may correspond to a customer system requiring low latency communication with resources of the AZ. The AZ may include one or multiple RAN-enabled edge servers 224 at a single cell site, or multiple RAN-enabled edge servers 224 distributed across multiple cell sites. The AZ management service 430 may provide dynamic management of such AZs, to include removing RAN-enabled edge servers 224 or limiting capacity placed thereon based upon additional resources required to service the DU or CU functions on the RAN-enabled edge servers 224, or making additional capacity on RAN-enabled edge servers 224 available in response to demand and excess capacity availability.

The excess capacity prediction service 433 is executed to generate predictions of spare or excess capacity on RAN-enabled edge servers 224 that remains after DU or CU function usage. In this regard, the excess capacity prediction service 433 may use machine learning and/or artificial intelligence to profile DU or CU implementations from different vendors or DU/CU implementations that are CSP-deployment specific to ascertain predicted maximum levels of resource usage. The excess capacity may include unused processor cores, memory, storage, GPU time, hardware accelerator time, and so on. The excess capacity may be mapped onto particular types of virtual machine instances of differing resource sizes and capabilities so that a combination of one or more different instance types may be offered.

The excess capacity auditing service 436 may be executed to audit the actual resource usage on the RAN-enabled edge servers 224. For example, the usage of the RAN-enabled edge servers 224 may be periodically polled by the excess capacity auditing service 436. In one scenario, the excess capacity auditing service 426 may reoptimize the distribution of non-latency sensitive workloads in order to reduce usage.

The data stored in the data store 415 includes, for example, data regarding cell sites 439, one or more DU and/or CU implementations 442, resource consumption data 445, one or more machine learning (ML) models 448, one or more dynamic AZs 451, one or more customer workloads 454, edge server excess capacity 457, one or more excess capacity rules 460, and potentially other data.

The data regarding cell sites 439 may include a corresponding location 463, one or more spectrum assignments 466, edge server data 469, and/or other data. The location 463 may correspond to a geographic location of the cell site 439 and/or the RAN-enabled edge server 224 located at the cell site 439. The location 463 may include latitude and longitude coordinates and may be configured manually or determined automatically, e.g., by a global navigation satellite system (GNSS) device such as a Global Positioning System (GPS) device.

The spectrum assignments 466 correspond to spectrum that is assigned to the radio units at the cell sites 439. Such spectrum may be licensed or unlicensed, and unlicensed spectrum may be allocated (e.g., Citizens Broadband Radio Service (CBRS)) or unallocated (e.g., television whitespaces). The spectrum assignments 466 may in some cases be broadly indicative of a number of UEs supported by the cell site 439 and a potential load on the DU.

The edge server data 469 describes the RAN-enabled edge servers 224 that are located at the cell site 439. Such servers may be manufactured in different form factors or in successive versions, with differing resource capacities and capabilities. The edge server data 469 may include data regarding utilization of the computing resources of the RAN-enabled edge servers 224, to include processor core utilization, memory utilization, storage utilization, hardware accelerator utilization (e.g., utilization on off-load devices 347 or physical layer accelerators 350), GPU utilization, network link utilization, and so forth.

The DU and/or CU implementations 442 correspond to virtual machine images, container images, software, configurations, etc. associated with specific implementations of DU functions. The DU and/or CU implementations 442 may be vendor specific and/or CSP-deployment specific. There may be different versions of the DU and/or CU implementations 442 from the same vendor or for the same CSP (e.g., updated versions or versions for specific requirements).

Although the DU and/or CU implementations 442 may generally implement the DU and/or CU functions according to a standard, the different DU and/or CU implementations 442 may vary in their resource consumption profiles. Specifically, respective resource consumption levels 472 (e.g., maximum, minimum, average, median, etc.) may be predicted or determined for each respective DU and/or CU implementation 442. A first portion of a resource consumption level 472 may correspond to a relatively static resource usage associated with Layer 1 (physical layer) processing, while a second portion of the resource consumption level 472 may be based on Layer 2 (data link layer) processing, which may be more dynamic in nature based upon usage.

The resource consumption data 445 may correspond to data recording resource consumption in RAN-enabled edge servers 224. Such data may include historical data associated with actual deployments and/or data from observing a test system. The ML models 448 may be trained to predict resource consumption for a specific DU and/or CU implementation 442 at a cell site 439 given the characteristics of the cell site 439 such as spectrum assignments 466, number of UEs, and so on. The ML models 448 may be trained on the existing resource consumption data 445 and/or may be updated based upon resource consumption data 445 observed over time.

The dynamic AZs 451 correspond to AZs managed by the AZ management service 430 and encompassing one or more specific RAN-enabled edge servers 224 at cell sites 439. The dynamic AZs 451 may be created based at least in part on a customer-supplied definition. The capacity of the dynamic AZ 451 may vary over time based upon the resource consumption of the DU functions on the RAN-enabled edge servers 224. Also, a customer may modify the definition of the dynamic AZ 451 dynamically to include or exclude RAN-enabled edge servers 224.

The customer workloads 454 correspond to machine images, containers, or functions of the customer that may be executed alongside the DU functions in the RAN-enabled edge server 224. For example, the customer workloads 454 may provide or support a customer application or service. In various examples, the customer workloads 454 relate to factory automation, autonomous robotics, augmented reality, virtual reality, design, surveillance, medical procedure support, and so on.

The edge server excess capacity 457 is the amount of excess capacity on a RAN-enabled edge server 224 that remains after accounting for the usage of the DU functions. The edge server excess capacity 457 may be predicted by the excess capacity prediction service 433 based at least in part on the predicted resource consumption levels 472 corresponding to a particular DU and/or CU implementation 442. The excess capacity rules 460 may control how the excess capacity can be used. For example, in the absence of a demand meeting a minimum threshold, the excess capacity rules 460 may specify that hardware such as unused processor cores or accelerators should be disabled or put into a low power mode. In such cases, the prices paid by third-party customers for utilizing the capacity may be less than the operational cost of the hardware components. Otherwise, if demand exceeds the minimum threshold, the excess capacity rules 460 may specify combinations of machine instance types, containers, etc., that can be allocated in the excess capacity.

The client device 406 is representative of a plurality of client devices 406 that may be coupled to the network 412. The client device 406 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 406 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 406 may be configured to execute various applications such as a client application 475 and/or other applications. The client application 475 may be executed in a client device 406, for example, to access network content served up by the computing environment 403 and/or other servers, thereby rendering a user interface on the display. To this end, the client application 475 may comprise, for example, a browser, a dedicated application, etc., and the user interface may comprise a network page, an application screen, etc. The client device 406 may be configured to execute applications beyond the client application 475 such as, for example, email applications, social networking applications, word processors, spreadsheets, and/or other applications.

Figure 5A:
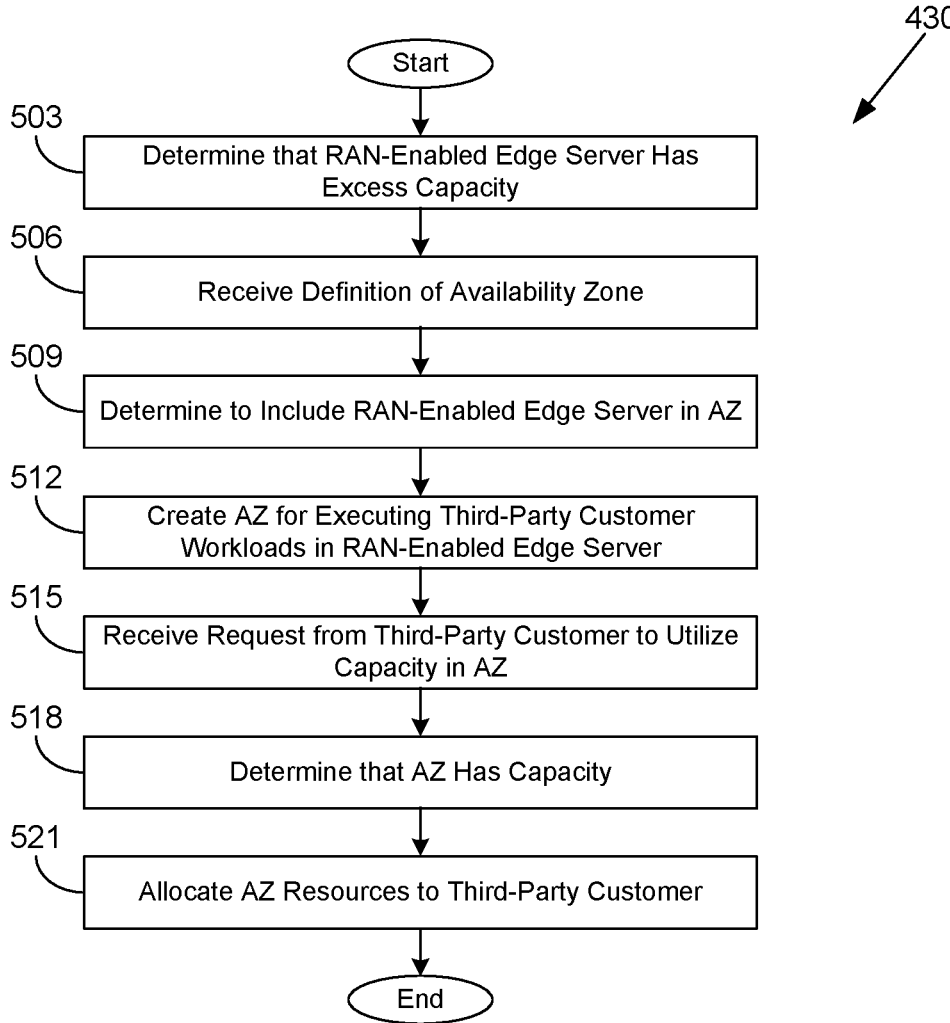

Referring next to FIG. 5A, shown is a flowchart that provides one example of the operation of a portion of the AZ management service 430 according to various embodiments. It is understood that the flowchart of FIG. 5A provides merely an example of the many different types of functional arrangements that may be employed to implement the operation of the portion of the AZ management service 430 as described herein. As an alternative, the flowchart of FIG. 5A may be viewed as depicting an example of elements of a method implemented in the computing environment 403 (FIG. 4) according to one or more embodiments.

Beginning with box 503, the AZ management service 430 determines that a RAN-enabled edge server 224 has excess resource capacity beyond a quantity needed to execute the DU network functions and/or CU network functions for a RAN 409 at a cell site 439. The excess resource capacity may include processor cores, memory, storage, network bandwidth, excess time/capacity on an off-load device 347, excess time/capacity on a physical layer accelerator 350, excess time/capacity on a GPU, and so on. The excess resource capacity may be determined or predicted by the excess capacity prediction service 433, understanding that the instantaneous excess capacity at any given time may be higher than when the DU network functions or CU network functions are under load. For example, the excess resource capacity may correspond to a set of processor cores in the RAN-enabled edge server 224 that are predicted not to be utilized by the DU network functions or the CU network functions.

In box 506, the AZ management service 430 receives a definition of a cellular availability zone, which may indicate the capacity pool of the cellular AZ. For example, a capacity pool of the cellular AZ may be composed of the excess resource capacity of the RAN-enabled edge server 224 and any excess resource capacity of other RAN-enabled edge servers within a predefined geographic area. The definition may be supplied by a customer of the cloud provider network 203 that operates the RAN-enabled edge server 224. For example, the definition may be received from a client application 475 executed on a client device 406 via the network 412. Alternatively, the definition may be received via an API. In some examples, the definition may include a location and a radius extending from that location or another definition of a geographic area boundary. The specified location may correspond to the location of a client application or system that requires a workload to be within a certain distance to minimize latency. In another example, the definition may explicitly indicate one or more cell sites 439. The definition may include a duration or lifetime for the cellular AZ before the cellular AZ expires. In some cases, the definition may be specified or altered by a CSP for which the DU is hosted on the RAN-enabled edge server 224.

In box 509, the AZ management service 430 determines to include the RAN-enabled edge server 224 within the cellular AZ to be created according to the definition. For example, the AZ management service 430 may compare the location 463 of the cell site 439 that includes the RAN-enabled edge server 224 to the definition of the cellular AZ to determine whether the location 463 should be included.

In box 512, the AZ management service 430 dynamically creates the cellular AZ according to the definition, where the cellular AZ is for executing customer workloads 454 of third-party customers of a cloud provider network 203 (as compared to workloads of the CSP or other entity that operates the RAN 409). As used herein, "third-party" cloud customers are distinguished from the entity that operates the RAN 409 (first party) or the cloud provider network 203 (second party). The cellular AZ may include one RAN-enabled edge server 224 at a single cell site 439, multiple RAN-enabled edge servers 224 at a single cell site 439, or multiple RAN-enabled edge servers 224 dispersed among multiple cell sites 439. As part of creating the cellular AZ, the AZ management service 430 may also dynamically create or adjust east-west network connections from existing network links or newly commissioned network links to interconnect a plurality of RAN-enabled edge servers 224 in the cellular AZ. The bandwidth of these east-west links may be set based at least in part on a measure of the excess capacity in a particular RAN-enabled edge server 224. It is noted that the capacity pool of the cellular AZ may be dynamically updated based on monitoring the actual amount of unused capacity over time and/or monitoring the addition or removal of RAN-enabled edge servers 224 within the predefined area over time.

In box 515, the AZ management service 430 receives a request from a third-party customer of the cloud provider network 203 to utilize resource capacity in the cellular AZ. The request may be to instantiate a virtual machine instance 322, execute containers 341, execute serverless functions, etc. The request may be received from the client application 475 or by way of an API. The request may be an explicit request to utilize the cellular AZ or an implicit request, such as a workload profile that is fulfillable only by placement in the cellular AZ (e.g., due to latency requirements).

In box 518, the AZ management service 430 determines whether the cellular AZ has capacity to accommodate the request. In this regard, the AZ management service 430 may determine whether individual ones of potentially multiple RAN-enabled edge servers 224 has available capacity (i.e., determined excess capacity minus capacity already allocated to workloads of third-party customers). If the cellular AZ has the capacity to accommodate the request, in box 521, the AZ management service 430 allocates cellular AZ resources to the third-party customer to fulfill the request. For example, the AZ management service 430 may allocate a requested virtual machine instance 322 to the third-party customer on the RAN-enabled edge server 224.

In one embodiment, the AZ management service 430 may determine a location associated with the request of the third-party customer, such as a location of a server or application on the customer's premises. The AZ management service 430 may then allocate resources of the RAN-enabled edge server 224 to the third-party customer in response to the request based at least in part on a distance between the location and a location of the RAN-enabled edge server 224. Thereafter, the operation of the portion of the AZ management service 430 ends.

Figure 5B:
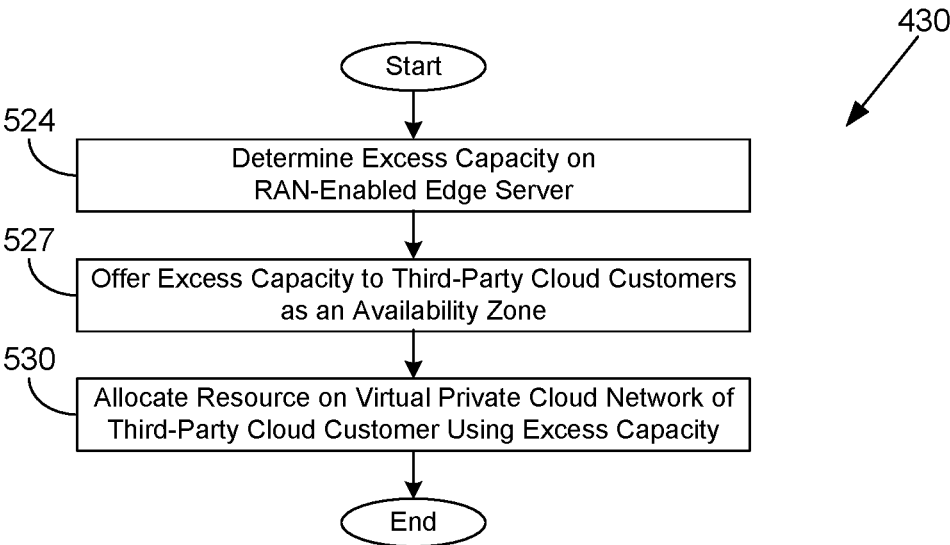

Moving on to FIG. 5B, shown is a flowchart that provides one example of the operation of another portion of the AZ management service 430 according to various embodiments. It is understood that the flowchart of FIG. 5B provides merely an example of the many different types of functional arrangements that may be employed to implement the operation of the portion of the AZ management service 430 as described herein. As an alternative, the flowchart of FIG. 5B may be viewed as depicting an example of elements of a method implemented in the computing environment 403 (FIG. 4) according to one or more embodiments.

Beginning with box 524, the AZ management service 430 determines that a RAN-enabled edge server 224 has excess resource capacity beyond a quantity needed to execute the DU network functions and/or CU network functions for a RAN 409 at a cell site 439. The excess resource capacity may include processor cores, memory, storage, network bandwidth, time/capacity on an off-load device 347, time/capacity on a physical layer accelerator 350, time/capacity on a GPU, and so on. The excess resource capacity may be determined or predicted by the excess capacity prediction service 433, understanding that the instantaneous excess capacity at any given time may be higher than when the DU network functions and/or CU network functions are under load.

The AZ management service 430 may also determine a combination of a plurality of different machine instance types that can be allocated from the excess resource capacity, where the different machine instance types may differ in terms of having different capabilities and/or different resource capacities.

In box 527, the AZ management service 430 offers the excess capacity of the RAN-enabled edge server 224 to third-party customers of a cloud provider network 203 that operates the RAN-enabled edge server 224. The third-party customers may differ from a CSP or other operator of the RAN 409. In some cases, the third-party customer may be a different CSP operating a different RAN 409, where the different RAN 409 utilizes the same cell site 439 or another cell site 439 within a threshold distance of the cell site 439 where the RAN-enabled edge server 224 is located.

The excess capacity may be offered as part of a dynamic AZ 451 encompassing the cell site 439, such as a cellular capacity zone that is generally available to customers of the cloud provider network 203. In some cases, the dynamic AZ 451 may be parented to a particular cloud region 306 and may constitute a separate georedundant availability zone for the region 306. That is to say, the dynamic AZ 451 may be one of several availability zones within the region 306. Subsequently, machine instances, container workloads, serverless functions, etc., of the third-party customer may be launched or executed in the dynamic AZ 451 in response to requests by the third-party customer. In some cases, customer workloads may be migrated from the RAN-enabled edge server 224 to another location in the dynamic AZ 451 or in the cloud provider network 203 in order to provide increased computing resources to the DU network functions and/or CU network functions.

In box 530, the AZ management service 430 may allocate one or more resources (e.g., machine instances, containers, serverless functions) on a virtual private cloud (VPC) network of the third-party customer using the excess capacity of the RAN-enabled edge server 224. In doing so, the VPC network may be extended to include the RAN-enabled edge server 224, and specifically the third-party customer's VPC resources executed thereon. In some embodiments, a subnet of the VPC network may be created in the availability zone encompassing the excess resource capacity of the RAN-enabled edge server 224. The VPC resource may also be allocated based at least in part on a distance between a location of the RAN-enabled edge server 224 and the location of a device that communicates with the resource. Thereafter, the operation of the portion of the AZ management service 430 ends.

Figure 6A:
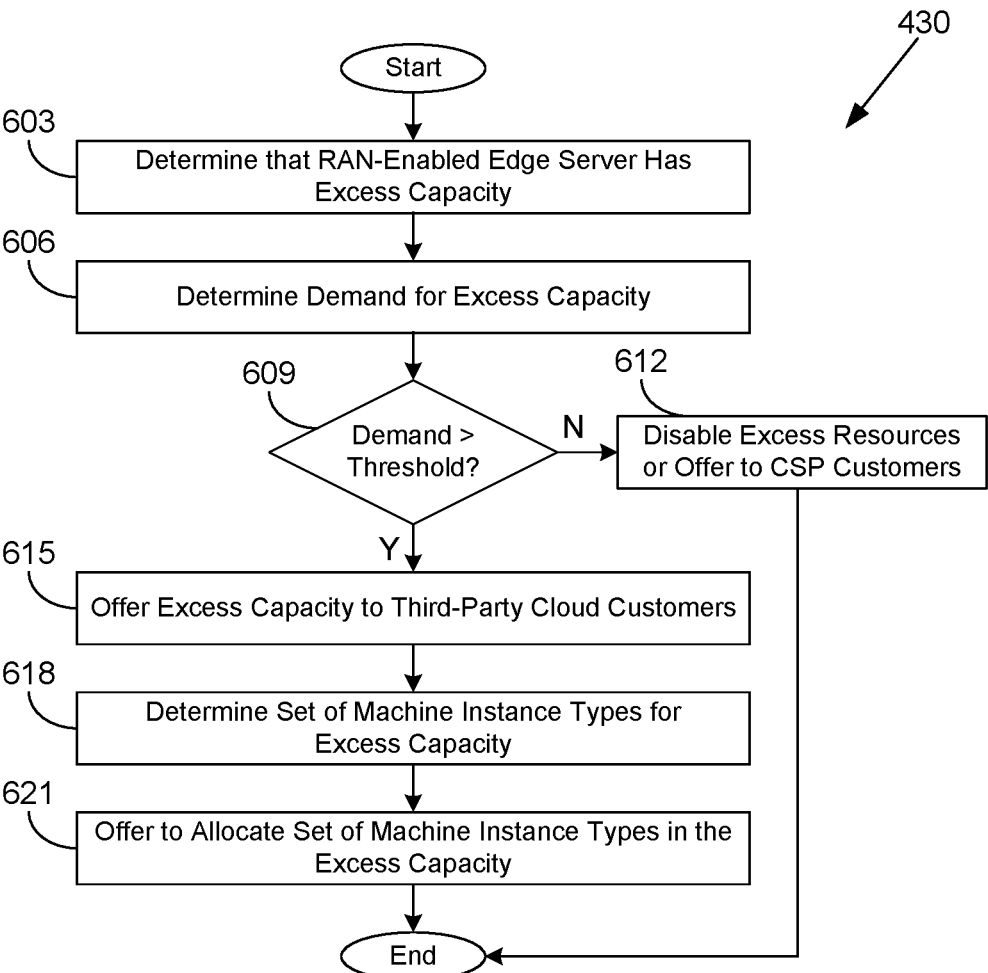

Turning now to FIG. 6A, shown is a flowchart that provides one example of the operation of another portion of the AZ management service 430 according to various embodiments. It is understood that the flowchart of FIG. 6A provides merely an example of the many different types of functional arrangements that may be employed to implement the operation of the portion of the AZ management service 430 as described herein. As an alternative, the flowchart of FIG. 6A may be viewed as depicting an example of elements of a method implemented in the computing environment 403 (FIG. 4) according to one or more embodiments.

Beginning with box 603, the AZ management service 430 determines that a RAN-enabled edge server 224 has excess resource capacity beyond a quantity needed to execute the DU network functions and/or CU network functions for a RAN 409 at a cell site 439. The excess resource capacity may include processor cores, memory, storage, network bandwidth, time/capacity on an off-load device 347, time/ capacity on a physical layer accelerator 350, time/capacity on a GPU, and so on. The excess resource capacity may be determined or predicted by the excess capacity prediction service 433, understanding that the instantaneous excess capacity at any given time may be higher than when the DU network functions and/or CU network functions are under load.

In box 606, the AZ management service 430 determines a demand from customers of the cloud provider network 203 for the excess capacity. The demand may include multiple components. For example, one component to the demand may be customers who are willing to pay a premium to host workloads at the location 463 of the cell site 439 due to the cell site 439 being in close geographical proximity to a system or application of the customer. Another component to the demand may be customers who are not seeking to host workloads at the location 463 but may seek capacity within a broader geographic region, or at any location of the cloud provider network 203. Such customers may not be willing to pay as much as the customers who need the edge capacity to minimize latency.

In box 609, the AZ management service 430 determines whether the demand meets or exceeds a minimum demand threshold. The minimum threshold may correspond, for example, to an amount required for cost recovery of operation of the excess capacity. If the demand does not meet the minimum demand threshold, the AZ management service 430 moves to box 612 and disables excess resources in the RAN-enabled edge server 224. In various embodiments, the AZ management service 430 may cause unused processor cores, accelerator cards, hard drives, memory, and so on, to be disabled to reduce cost. Disabling the hardware may reduce power consumption and heat load associated with the RAN-enabled edge server 224. In another scenario, the AZ management service 430 may offer the excess capacity for use by customers of the CSP rather than third-party cloud customers. Thereafter, the operation of the portion of the AZ management service 430 ends.

If the demand meets or exceeds the threshold, thereby providing cost recovery, the AZ management service 430 continues from box 609 to box 615. In box 615, the AZ management service 430 offers the excess capacity for use by third-party customers of the cloud provider network 203.

In box 618, the AZ management service 430 determines a set of machine instance types that are compatible with the excess capacity. For example, the types may include instances that have a relatively large processing capacity, a relatively small processing capacity, a relatively large data storage capability, a relatively small data storage capability, access to GPUs and other hardware accelerators, and so on. Whether specific instance types can be offered in the excess capacity of the RAN-enabled edge server 224 may depend on the capabilities and hardware present in the RAN-enabled edge server 224. In addition to instance types with different capabilities, the different instance types may include reserved instances for which capacity is allocated if not used, dedicated instances having a high priority so that they are not terminated, and on-demand ephemeral instances that may be terminated based upon higher priority users. Ephemeral compute instances, referred to in various implementations as spot instances, preemptible instances, spot virtual machines, transient instances, or preemptible virtual machine instances, refer to compute capacity that is not guaranteed for any particular period of time, but rather can be interrupted and reallocated to higher priority workloads (with or without an advanced notification warning of the imminent resource termination). In some implementations, by default all capacity in a cellular availability zone may be configured as ephemeral, with the network functions of the DU and/or CU set to take priority over any other workload whenever needed in order to satisfy demand for the network or operational parameters for the network. Algorithms that are used to assign types of machine instances to different types of hosts, such as the excess capacity of the RAN-enabled edge server 224, are described by U.S. patent application Ser. No. 17/958,091, entitled "HOST FLEET MANAGEMENT OPTIMIZATIONS IN A CLOUD PROVIDER NETWORK," and filed on Sep. 30, 2022, which is incorporated herein by reference in its entirety.

In box 621, the AZ management service 430 offers to allocate machine instance types from the set of different machine instance types in the excess capacity of the RAN-enabled edge server 224 for third-party customers of the cloud provider network. Subsequently, if resource consumption of the DU network functions and/or CU network functions increases, the AZ management service 430 may migrate one or more workloads of third-party customers away from the RAN-enabled edge server 224 to another RAN enabled edge server 224 in response to determining to allocate additional resources to the DU network functions and/or CU network functions. Thereafter, the operation of the portion of the AZ management service 430 ends.

Figure 6B:
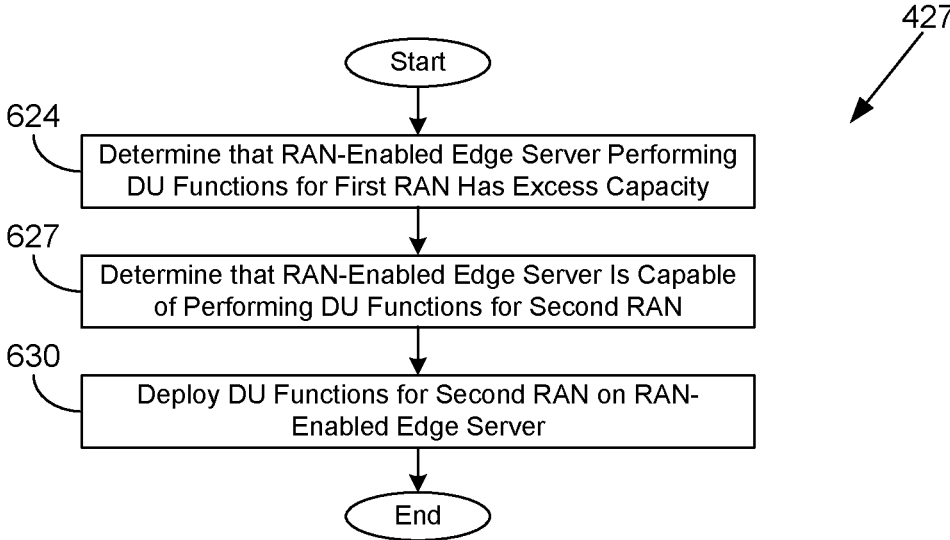
FIG. 6B is a flowchart illustrating an example of functionality implemented as portions of a radio access network management service executed in a computing environment in the networked environment of FIG. 4 according to various embodiments of the present disclosure.

Moving on to FIG. 6B, shown is a flowchart that provides one example of the operation of a portion of the RAN management service 427 according to various embodiments. It is understood that the flowchart of FIG. 6B provides merely an example of the many different types of functional arrangements that may be employed to implement the operation of the portion of the RAN management service 427 as described herein. As an alternative, the flowchart of FIG. 6B may be viewed as depicting an example of elements of a method implemented in the computing environment 403 (FIG. 4) according to one or more embodiments.

Beginning with box 624, the RAN management service 427 determines that a RAN-enabled edge server 224 has excess resource capacity beyond a quantity needed to execute the DU network functions and/or CU network functions for a first RAN 409 at a cell site 439. The excess resource capacity may include processor cores, memory, storage, network bandwidth, time/capacity on an off-load device 347, time/capacity on a physical layer accelerator 350, time/capacity on a GPU, and so on. The excess resource capacity may be determined or predicted by the excess capacity prediction service 433, understanding that the instantaneous excess capacity at any given time may be higher than when the DU network functions and/or CU network functions are under load.

In box 627, the RAN management service 427 determines that the RAN-enabled edge server 224 is capable of performing DU network functions and/or CU network functions for a second RAN 409. This determination may encompass determining that the excess capacity is sufficient to accommodate the additional DU network functions and/or CU network functions, which may include determining that excess capacity on a physical layer accelerator 350 is sufficient to accommodate the additional DU network functions 282. Additionally, the determination may take into account location constraints for executing the DU network functions and/or CU network functions. For example, DU network functions 282 may be for a second RAN 409 using the same cell site 439, or the DU network functions 282 may be for a second RAN 409 using a cell site 439 that is within a threshold distance of the RAN-enabled edge server 224 so as to avoid objectionable latency. It is noted that the DU network functions and/or CU network functions for the second RAN 409 may have different resource requirements as compared to the DU network functions and/or CU network functions for the first RAN 409.

In box 630, the RAN management service 427 deploys the DU network functions and/or CU network functions for the second RAN 409 on the RAN-enabled edge server 224. In this way, DU network functions and/or CU network functions for two different RANs 409 may be executed on the same RAN-enabled edge server 224. In one example, processor cores or other resources not used by either set of DU network functions and/or CU network functions may be disabled to reduce costs. In another example, resources of the RAN-enabled edge server 224 not used by either set of DU network functions and/or CU network functions may be offered for use by third-party customers of the cloud provider network 203. Thereafter, the operation of the portion of the RAN management service 427 ends.

Referring next to FIG. 7, shown is a flowchart that provides one example of the operation of a portion of the excess capacity prediction service 433 according to various embodiments. It is understood that the flowchart of FIG. 7 provides merely an example of the many different types of functional arrangements that may be employed to implement the operation of the portion of the excess capacity prediction service 433 as described herein. As an alternative, the flowchart of FIG. 7 may be viewed as depicting an example of elements of a method implemented in the computing environment 403 (FIG. 4) according to one or more embodiments.

Beginning with box 703, the excess capacity prediction service 433 generates resource consumption data 445 based at least in part on monitoring or analysis of a plurality of different DU and/or CU implementations 442. The resource consumption data 445 may track processor usage, memory usage, storage usage, GPU usage, off-load device 347 usage, physical layer accelerator 350 usage, and so on. The excess capacity prediction service 433 may monitor the DU and/or CU implementations 442 as executed on test or production servers. In some embodiments, the excess capacity prediction service 433 may be generated based at least in part on a static analysis of software of the DU and/or CU implementation 442 or a dynamic analysis of the DU and/or CU implementation 442 as it is executed.

In box 706, the excess capacity prediction service 433 may train a machine learning model 448 for predicting a resource consumption level, such as the maximum resource consumption, for each respective DU and/or CU implementation 442. The machine learning model 448 may be trained based at least in part on the resource consumption data 445 and potentially other data such as spectrum assignments 466. The spectrum assignments 466 may indicate or be a proxy for a rough gauge of network traffic to be processed by the respective DU and/or CU implementation 442. That is to say, a cell site 439 with more frequency spectrum may be predicted to handle a greater volume of network traffic than a cell site 439 with less frequency spectrum. Other relevant factors to predicting resource consumption may be identified through generative artificial intelligence (e.g., through generative adversarial networks (GANs)).

In box 709, the excess capacity prediction service 433 may predict the level of resource consumption (e.g., maximum level of resource consumption) for each respective DU and/or CU implementation 442 based at least in part on the resource consumption data 445 and potentially using the machine learning model 448. In box 712, the excess capacity prediction service 433 may deploy a particular DU and/or CU implementation 442 on a RAN-enabled edge server 224.

In box 715, the excess capacity prediction service 433 predicts the excess capacity of the RAN-enabled edge server 224. The excess capacity may be determined based at least in part on the capacity overall of the RAN-enabled edge server 224 and the level of resource consumption predicted for the DU and/or CU implementation 442 executed on the RAN-enabled edge server 224. The excess capacity may be determined for each of several types of resource available on the RAN-enabled edge server 224, such as processor cores, memory, storage, network bandwidth, GPU, hardware accelerators, etc. In some cases, excess capacity of a physical layer accelerator 350 not used by DU network functions 282 may be offered as a capability of a type of machine instance.

In box 718, the excess capacity prediction service 433 may update the machine learning model 448 for predicting the excess capacity based at least in part on the actual resource consumption of the DU and/or CU implementation 442 observed over time for the RAN-enabled edge server 224. The actual resource consumption may be determined by the excess capacity auditing service 436. In box 721, the excess capacity prediction service 433 may determine a change in actual excess capacity on the RAN-enabled edge server 224. Generally, the Layer 1 processing load for the DU and/or CU implementation 442 may be expected to remain static, while the Layer 2 processing load for the DU and/or CU implementation 442 is more likely to be dynamic and change over time with change in usage loads or numbers of UEs accessing the RAN 409.

In box 724, the excess capacity prediction service 433 performs an action based at least in part on the change in the actual excess capacity. In one example, the excess capacity is reduced, and resources allocated to third-party customers of a cloud provider network 203 may be terminated or migrated away from the RAN-enabled edge server 224 in order to free up resources for the DU and/or CU implementation 442. In another example, the excess capacity is increased, and additional types of machine instances or additional quantities of resources may be made available to third-party customers. Thereafter, the operation of the portion of the excess capacity prediction service 433 ends.

Figure 8:
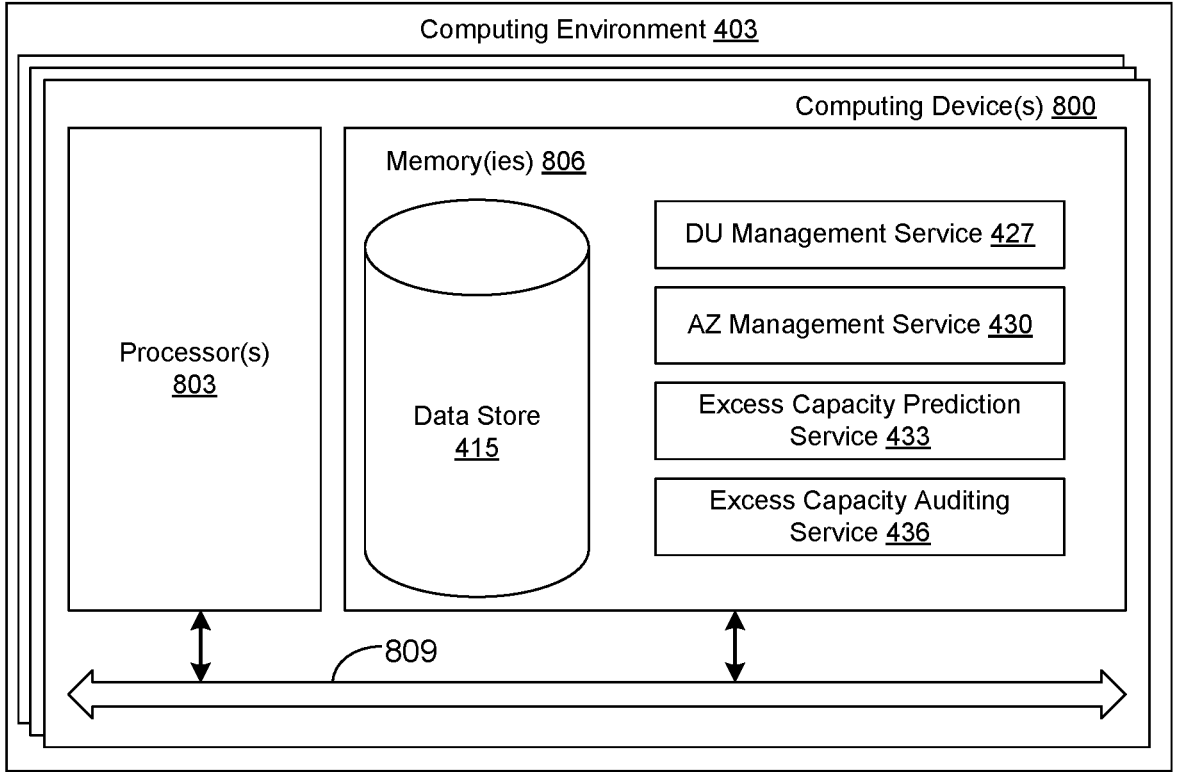
FIG. 8 is a schematic block diagram that provides one example illustration of a computing environment employed in the networked environment of FIG. 4 according to various embodiments of the present disclosure.

With reference to FIG. 8, shown is a schematic block diagram of the computing environment 403 according to an embodiment of the present disclosure. The computing environment 403 includes one or more computing devices 800. Each computing device 800 includes at least one processor circuit, for example, having a processor 803 and a memory 806, both of which are coupled to a local interface 809. To this end, each computing device 800 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the RAN management service 427, the AZ management service 430, the excess capacity auditing service 436, the excess capacity prediction service 433, and potentially other applications. Also stored in the memory 806 may be a data store 415 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the RAN management service 427, the AZ management service 430, the excess capacity auditing service 436, the excess capacity prediction service 433, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FP-GAs), or other components, etc. Such technologies are generally well known by those skilled in the art and, consequently, are not described in detail herein.

The flowcharts of FIGS. 5A-7 show the functionality and operation of an implementation of portions of the RAN management service 427, the AZ management service 430, and the excess capacity prediction service 433. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5A-7 show a specific order of execution, it is understood that the order of execution may differ from that which is depicted. For example, the order of execution of two or more blocks may be scrambled relative to the order shown. Also, two or more blocks shown in succession in FIGS. 5A-7 may be executed concurrently or with partial concurrence. Further, in some embodiments, one or more of the blocks shown in FIGS. 5A-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the RAN management service 427, the AZ management service 430, the excess capacity auditing service 436, and the excess capacity prediction service 433, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the RAN management service 427, the AZ management service 430, the excess capacity auditing service 436, and the excess capacity prediction service 433, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 800, or in multiple computing devices 800 in the same computing environment 403.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Embodiments of the present disclosure may be described by one or more of the following clauses:

Clause 1. A system, comprising: a radio access network (RAN)-enabled edge server of a cloud provider network and located at a cell site, the RAN-enabled edge server being configured to execute distributed unit (DU) functions for a RAN, the RAN-enabled edge server being operated by a first customer of the cloud provider network; and a computing device located in a region of the cloud provider network and configured to at least: determine that the RAN-enabled edge server has excess resource capacity beyond a quantity necessary to execute the DU functions for the RAN; create a cellular availability zone in the cloud provider network for executing third-party customer workloads on the excess resource capacity of the RAN-enabled edge server, wherein a capacity pool of the cellular availability zone is composed of the excess resource capacity of the RAN-enabled edge server and an excess resource capacity of other RAN-enabled edge servers within a predefined geographic area; determine to utilize the cellular availability zone for a second customer of the cloud provider network based at least in part on one or more of: an explicit request received from the second customer for the cellular availability zone, or a workload profile of the second customer that is fulfillable only by placement in the cellular availability zone, the second customer being different from the first customer; and allocate resources from the capacity pool of the cellular availability zone to the second customer.

Clause 2. The system of clause 1, wherein by default the capacity pool of the cellular availability zone is configured as ephemeral, with the DU functions having priority over the capacity pool.

Clause 3. The system of clauses 1 to 2, wherein the computing device is further configured to at least dynamically update the capacity pool based at least in part on at least one of: monitoring an actual amount of unused capacity over time; or monitoring an addition or a removal of one or more RAN-enabled edge servers in the predefined geographic area over time.

Clause 4. The system of clauses 1 to 3, wherein the excess resource capacity comprises a set of processor cores in the RAN-enabled edge server that are predicted not to be utilized by the DU functions.

Clause 5. The system of clauses 1 to 4, wherein the RAN-enabled edge server includes a physical layer accelerator specialized for DU physical layer communication, and the excess resource capacity includes excess capacity on the physical layer accelerator.

Clause 6. The system of clauses 1 to 5, wherein the cellular availability zone comprises the excess computing capacity of the RAN-enabled edge server and excess computing capacity of at least another RAN-enabled edge server located at the cell site.

Clause 7. The system of clauses 1 to 6, wherein the computing device is further configured to at least: determine a location associated with the request of the second customer; and allocate resources of the RAN-enabled edge server to the second customer in response to the request based at least in part on a distance between the location and a location of the RAN-enabled edge server.

Clause 8. The system of clauses 1 to 7, wherein the computing device is further configured to at least: receive a definition of the cellular availability zone from the second customer, the definition including the cell site; and wherein the cellular availability zone is dynamically created based at least in part on the definition.

Clause 9. The system of clauses 1 to 8, wherein the RAN-enabled edge server includes an off-load device specialized for performing virtualization functions for the RAN-enabled edge server.

Clause 10. A computer-implemented method, comprising: determining excess resource capacity on a radio access network (RAN)-enabled edge server in a cloud provider network, the RAN-enabled edge server being located at a cell site and configured to perform functions for a RAN; and offering the excess resource capacity as part of a cellular capacity zone that is generally available to customers of the cloud provider network.

Clause 11. The computer-implemented method of clause 10, further comprising determining a combination of a plurality of different machine instance types that can be allocated from the excess resource capacity, the plurality of different machine instance types having at least one of: different capabilities or different resource capacities.

Clause 12. The computer-implemented method of clauses 10 to 11, wherein the RAN is operated by a first communication service provider (CSP), and offering the excess resource capacity to the third-party customers further comprises offering the excess resource capacity to a second CSP having another RAN utilizing either the cell site or another cell site within a threshold distance of the cell site.

Clause 13. The computer-implemented method of clauses 10 to 12, wherein the cellular capacity zone is parented to a region of the cloud provider network and constitutes a separate georedundant availability zone for the region.

Clause 14. The computer-implemented method of clauses 10 to 13, further comprising launching at least one of: a machine instance, a container workload, or a serverless function in the cellular capacity zone in response to a request from a third-party customer.

Clause 15. The computer-implemented method of clauses 10 to 14, further comprising migrating a customer workload from the RAN-enabled edge server to another location in the cloud provider network to provide increased computing resources to the functions.

Clause 16. The computer-implemented method of clauses 10 to 15, wherein the RAN-enabled edge server includes a physical layer accelerator specialized for distributed unit (DU) physical layer communication.

Clause 17. The computer-implemented method of clauses 10 to 16, wherein the RAN-enabled edge server includes an off-load device specialized for performing virtualization functions or container management functions for the RAN-enabled edge server.

Clause 18. A computer-implemented method, comprising: determining excess resource capacity on a RAN-enabled edge server in a cloud provider network, the RAN-enabled edge server being located at a cell site and configured to perform at least one of: distributed unit (DU) functions or centralized unit (CU) functions for a RAN; and allocating a resource on a virtual private cloud network of a third-party customer of the cloud provider network using the excess resource capacity.

Clause 19. The computer-implemented method of clause 18, further comprising creating a subnet of the virtual private cloud network in a cellular availability zone that includes the excess resource capacity of the RAN-enabled edge server.

Clause 20. The computer-implemented method of clause 18, further comprising: determining a location of a device that communicates with the resource; and determining to allocate the resource using the excess resource capacity based at least in part on a distance between a location of the RAN-enabled edge server and the location of the device.

Clause 21. A system, comprising: a radio access network (RAN)-enabled edge server located at a cell site, the RAN-enabled edge server being configured to execute distributed unit (DU) functions for a RAN, the RAN-enabled edge server including a physical layer accelerator specialized for DU physical layer communication; and a computing device configured to at least: determine that the RAN-enabled edge server has excess resource capacity beyond a quantity necessary to execute the DU functions for the RAN; determine a demand for the excess resource capacity from a cloud provider network; determine whether to offer the excess resource capacity to customers of the cloud provider network based at least in part on the demand; and determine a mapping of the excess resource capacity to one or more machine instance types based at least in part on one or more of available processor, memory, or storage resources.

Clause 22. The system of clause 21, wherein the excess resource capacity includes capacity on the physical layer accelerator.

Clause 23. The system of clauses 21 to 22, wherein the computing device is further configured to at least disable one or more processor cores of the RAN-enabled edge server in response to determining that the demand is below a minimum threshold.

Clause 24. The system of clauses 21 to 23, wherein the computing device is further configured to at least migrate one or more workloads of third-party customers away from the RAN-enabled edge server to another RAN-enabled edge server in response to determining to allocate additional resources to the DU functions.

Clause 25. The system of clauses 21 to 24, wherein the computing device is further configured to at least offer one or more processor cores of the RAN-enabled edge server for use by the customers in response to determining that the demand exceeds a minimum threshold.

Clause 26. The system of clauses 21 to 25, wherein the demand is associated with a bid value for the excess resource capacity from one or more of the customers.

Clause 27. The system of clauses 21 to 26, wherein the demand includes a first portion corresponding to a demand by the customers to execute workloads based at least in part on a geographical proximity of the cell site to a location, and a second portion corresponding to a demand by the customers to execute workloads within a region of the cloud provider network that encompasses the cell site.

Clause 28. A computer-implemented method, comprising: determining that a radio access network (RAN)-enabled edge server has excess capacity, the RAN-enabled edge server being located at a cell site and configured to perform functions for a first RAN of a first communication service provider (CSP), the RAN-enabled edge server including a physical layer accelerator utilized for the functions of the first RAN; and deploying functions for a second RAN of a second CSP in response to determining that the RAN-enabled edge server has the excess capacity.

Clause 29. The computer-implemented method of clause 28, wherein the functions of the first RAN and the functions of the second RAN have different resource requirements.

Clause 30. The computer-implemented method of clauses 28 to 29, wherein the RAN-enabled edge server is operated as an extension of a cloud provider network.

Clause 31. The computer-implemented method of clauses 28 to 30, further comprising disabling one or more processor cores of the RAN-enabled edge server that are unused by the functions of the first RAN and the functions of the second RAN.

Clause 32. The computer-implemented method of clauses 28 to 31, further comprising offering a portion of the excess capacity on the RAN-enabled edge server for use by customers of a cloud provider network, the portion of the excess capacity being that which remains after deploying the functions of the second RAN.

Clause 33. The computer-implemented method of clauses 28 to 32, wherein the physical layer accelerator is specialized for distributed unit (DU) physical layer communication, and the functions of the second RAN utilize excess capacity of the physical layer accelerator.

Clause 34. The computer-implemented method of clauses 28 to 33, wherein both the first RAN and the second RAN operate at the cell site.

Clause 35. The computer-implemented method of clauses 28 to 34, wherein the second RAN operates from a different cell site within a geographic proximity of the cell site.

Clause 36. A computer-implemented method, comprising: determining that a radio access network (RAN)-enabled edge server has excess capacity, the RAN-enabled edge server being located at a cell site and configured to perform at least one of: distributed unit (DU) functions or centralized unit (CU) functions for a RAN; determining a set of one or more different machine instance types of a plurality of different machine instance types that can be deployed using the excess capacity; and offering to allocate the set of the one or more different machine instance types on the RAN-enabled edge server to customers of a cloud provider network.

Clause 37. The computer-implemented method of clause 36, wherein the RAN-enabled edge server includes a physical layer accelerator specialized for DU physical layer communication, the DU functions of the RAN utilize the physical layer accelerator, and the set of the one or more different machine instance types includes a machine instance type that uses excess capacity of the physical layer accelerator to provide a capability.

Clause 38. The computer-implemented method of clauses 36 to 37, wherein the plurality of different machine instance types includes machine instance types having at least one of: different respective resource capacities or different capabilities.

Clause 39. The computer-implemented method of clauses 36 to 38, wherein the set of the one or more machine instance types includes a reserved machine instance type.

Clause 40. The computer-implemented method of clauses 36 to 39, wherein the set of the one or more machine instance types includes an ephemeral machine instance type.

Clause 41. A system, comprising: a radio access network (RAN)-enabled edge server located at a cell site, the RAN-enabled edge server including a physical layer accelerator specialized for distributed unit (DU) physical layer communication; and a computing device configured to at least: generate resource consumption data by monitoring resource consumption of a plurality of implementations of a DU used in RANs; predict a maximum level of resource consumption for a particular implementation of the DU to be used in a particular RAN based at least in part on the resource consumption data; deploy the particular implementation of the DU on the RAN-enabled edge server; and predict excess resource capacity on the RAN-enabled edge server based at least in part on the maximum level of resource consumption that is predicted.

Clause 42. The system of clause 41, wherein the excess resource capacity includes excess capacity on the physical layer accelerator that is predicted based at least in part on a maximum level of Layer 1 resource consumption that is predicted.

Clause 43. The system of clauses 41 to 42, wherein the computing device is further configured to at least train a machine learning model based at least in part on the resource consumption data and data indicating corresponding spectrum assignments, wherein the maximum level of resource consumption is determined through the machine learning model.

Clause 44. The system of clause 43, wherein the computing device is further configured to at least update the machine learning model based at least in part on actual resource consumption of the particular implementation of the DU on the RAN-enabled edge server.

Clause 45. The system of clauses 41 to 44, wherein the computing device is further configured to at least predict a quantity of reserved machine instances that can be allocated in the excess capacity based at least in part on the resource consumption data.

Clause 46. The system of clauses 41 to 45, wherein the computing device is further configured to at least predict a quantity of ephemeral machine instances that can be allocated in the excess capacity based at least in part on the resource consumption data.

Clause 47. A computer-implemented method, comprising: generating resource consumption data by monitoring resource consumption of a plurality of implementations of at least one of: a distributed unit (DU) or a centralized unit (CU) used in radio access networks (RANs); predicting a level of resource consumption for a particular implementation of the DU or the CU to be used in a particular RAN based at least in part on the resource consumption data; and predicting excess resource capacity on a RAN-enabled edge server on which the particular implementation of the DU or the CU is deployed for a cell site of the RAN based at least in part on the maximum level of resource consumption.

Clause 48. The computer-implemented method of clause 47, further comprising offering the excess resource capacity of the RAN-enabled edge server to third-party customers of a cloud provider network.

Clause 49. The computer-implemented method of clauses 47 to 48, wherein the plurality of implementations of the DU or the CU corresponds to a plurality of different vendors of the DU or the CU.

Clause 50. The computer-implemented method of clauses 47 to 49, further comprising: performing a static analysis on the particular implementation of the DU or the CU; and wherein predicting the level of resource consumption for the particular implementation of the DU or the CU is further based at least in part on the static analysis.

Clause 51. The computer-implemented method of clauses 47 to 50, further comprising: determining spectrum assignments of the cell site of the RAN; and wherein predicting the level of resource consumption for the particular implementation of the DU or the CU is further based at least in part on the spectrum assignments.

Clause 52. The computer-implemented method of clauses 47 to 51, wherein predicting the maximum level of resource consumption for the particular implementation of the DU further comprises: predicting a maximum level of Layer 1 resource consumption for the particular implementation of the DU, wherein the maximum level of Layer 1 resource consumption is static; and predicting a maximum level of Layer 2 resource consumption for the particular implementation of the DU, wherein the maximum level of Layer 1 resource consumption is dynamic.

Clause 53. The computer-implemented method of clause 52, further comprising predicting excess capacity of a physical layer accelerator specialized for DU physical layer communication used in the RAN-enabled edge server based at least in part on the maximum level of Layer 1 resource consumption.

Clause 54. The computer-implemented method of clauses 52 to 53, further comprising predicting a quantity of processor cores in the RAN-enabled edge server corresponding to excess capacity based at least in part on the maximum level of Layer 2 resource consumption.

Clause 55. A computer-implemented method, comprising: generating resource consumption data by monitoring resource consumption of a plurality of implementations of a distributed unit (DU) used in radio access networks (RANs); predicting excess resource capacity on a RAN-enabled edge server on which a particular implementation of the DU is deployed for a cell site of a RAN based at least in part on the resource consumption data; and determining a change in the excess resource capacity of the RAN-enabled edge server based at least in part on a change in Layer 2 resource consumption by the DU.

Clause 56. The computer-implemented method of clause 55, further comprising: predicting a demand for the excess resource capacity on the RAN-enabled edge server; and determining to enable or disable one or more processor cores of the RAN-enabled edge server based at least in part on the demand that is predicted.

Clause 57. The computer-implemented method of clauses 55 to 56, further comprising offering the excess resource capacity on the RAN-enabled edge server for customers of a cloud provider network as a cellular availability zone of the cloud provider network.

Clause 58. The computer-implemented method of clauses 55 to 57, further comprising migrating a workload of a customer of a cloud provider network away from the RAN-enabled edge server based at least in part on the change in the excess resource capacity in order to accommodate an increase in Layer 2 resource consumption by the DU.

Clause 59. The computer-implemented method of clause 58, wherein the workload is migrated to a different RAN-enabled edge server selected based at least in part on a proximity to the RAN-enabled edge server.

Clause 60. The computer-implemented method of clauses 55 to 59, further comprising migrating a workload of a customer of a cloud provider network to the RAN-enabled edge server based at least in part on the change in the excess resource capacity from a decrease in Layer 2 resource consumption by the DU.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a radio access network (RAN)-enabled edge server located at a cell site, the RAN-enabled edge server including a physical layer accelerator specialized for distributed unit (DU) physical layer communication; and
   a computing device configured to at least:
      generate resource consumption data by monitoring resource consumption of a plurality of implementations of a DU used in RANs;
      predict a maximum level of resource consumption for a particular implementation of the DU to be used in a particular RAN based at least in part on the resource consumption data;
      deploy the particular implementation of the DU on the RAN-enabled edge server; and
      predict excess resource capacity on the RAN-enabled edge server based at least in part on the maximum level of resource consumption that is predicted.

2. The system of claim 1, wherein the excess resource capacity includes excess capacity on the physical layer accelerator that is predicted based at least in part on a maximum level of Layer 1 resource consumption that is predicted.

3. The system of claim 1, wherein the computing device is further configured to at least train a machine learning model based at least in part on the resource consumption data and data indicating corresponding spectrum assignments, wherein the maximum level of resource consumption is determined through the machine learning model.

4. The system of claim 3, wherein the computing device is further configured to at least update the machine learning model based at least in part on actual resource consumption of the particular implementation of the DU on the RAN-enabled edge server.

5. The system of claim 1, wherein the computing device is further configured to at least predict a quantity of reserved machine instances that can be allocated in the excess capacity based at least in part on the resource consumption data.

6. The system of claim 1, wherein the computing device is further configured to at least predict a quantity of ephemeral machine instances that can be allocated in the excess capacity based at least in part on the resource consumption data.

7. A computer-implemented method, comprising:
  generating resource consumption data by monitoring resource consumption of a plurality of implementations of at least one of: a distributed unit (DU) or a centralized unit (CU) used in radio access networks (RANs);
  predicting a level of resource consumption for a particular implementation of the DU or the CU to be used in a particular RAN based at least in part on the resource consumption data; and
  predicting excess resource capacity on a RAN-enabled edge server on which the particular implementation of the DU or the CU is deployed for a cell site of the RAN based at least in part on the level of resource consumption.

8. The computer-implemented method of claim 7, further comprising offering the excess resource capacity of the RAN-enabled edge server to third-party customers of a cloud provider network.

9. The computer-implemented method of claim 7, wherein the plurality of implementations of the DU or the CU corresponds to a plurality of different vendors of the DU or the CU.

10. The computer-implemented method of claim 7, further comprising:
  performing a static analysis on the particular implementation of the DU or the CU; and
  wherein predicting the level of resource consumption for the particular implementation of the DU or the CU is further based at least in part on the static analysis.

11. The computer-implemented method of claim 7, further comprising:
  determining spectrum assignments of the cell site of the RAN; and
  wherein predicting the level of resource consumption for the particular implementation of the DU or the CU is further based at least in part on the spectrum assignments.

12. The computer-implemented method of claim 7, wherein predicting the level of resource consumption for the particular implementation of the DU further comprises:

predicting a maximum level of Layer 1 resource consumption for the particular implementation of the DU, wherein the maximum level of Layer 1 resource consumption is static; and
  predicting a maximum level of Layer 2 resource consumption for the particular implementation of the DU, wherein the maximum level of Layer 1 resource consumption is dynamic.

13. The computer-implemented method of claim 12, further comprising predicting excess capacity of a physical layer accelerator specialized for DU physical layer communication used in the RAN-enabled edge server based at least in part on the maximum level of Layer 1 resource consumption.

14. The computer-implemented method of claim 12, further comprising predicting a quantity of processor cores in the RAN-enabled edge server corresponding to excess capacity based at least in part on the maximum level of Layer 2 resource consumption.

15. A computer-implemented method, comprising:
  generating resource consumption data by monitoring resource consumption of a plurality of implementations of a distributed unit (DU) used in radio access networks (RANs);
  predicting excess resource capacity on a RAN-enabled edge server on which a particular implementation of the DU is deployed for a cell site of a RAN based at least in part on the resource consumption data; and
  determining a change in the excess resource capacity of the RAN-enabled edge server based at least in part on a change in Layer 2 resource consumption by the DU.

16. The computer-implemented method of claim 15, further comprising:
  predicting a demand for the excess resource capacity on the RAN-enabled edge server; and
  determining to enable or disable one or more processor cores of the RAN-enabled edge server based at least in part on the demand that is predicted.

17. The computer-implemented method of claim 15, further comprising offering the excess resource capacity on the RAN-enabled edge server for customers of a cloud provider network as a cellular availability zone of the cloud provider network.

18. The computer-implemented method of claim 15, further comprising migrating a workload of a customer of a cloud provider network away from the RAN-enabled edge server based at least in part on the change in the excess resource capacity in order to accommodate an increase in Layer 2 resource consumption by the DU.

19. The computer-implemented method of claim 18, wherein the workload is migrated to a different RAN-enabled edge server selected based at least in part on a proximity to the RAN-enabled edge server.

20. The computer-implemented method of claim 15, further comprising migrating a workload of a customer of a cloud provider network to the RAN-enabled edge server based at least in part on the change in the excess resource capacity from a decrease in Layer 2 resource consumption by the DU.

* * * * *